(12) United States Patent
Saito

(10) Patent No.: US 7,227,552 B1
(45) Date of Patent: Jun. 5, 2007

(54) IMAGE PROCESSING APPARATUS AND METHOD AND STORAGE MEDIUM

(75) Inventor: Kazuhiro Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,420

(22) Filed: Dec. 22, 1998

(30) Foreign Application Priority Data

Dec. 25, 1997 (JP) .................................. 9-357268
Dec. 25, 1997 (JP) .................................. 9-357269

(51) Int. Cl.
*G09G 5/02* (2006.01)
(52) U.S. Cl. ..................................................... 345/589
(58) Field of Classification Search ................ 382/167; 358/518, 520; 345/589
See application file for complete search history.

(56) References Cited

U.S. PATENT DOCUMENTS

| | | | | |
|---|---|---|---|---|
| 4,500,919 A | * | 2/1985 | Schreiber .................... | 358/518 |
| 4,831,434 A | | 5/1989 | Fuchsberger ................. | 358/80 |
| 4,989,079 A | | 1/1991 | Ito .............................. | 358/80 |
| 5,130,789 A | * | 7/1992 | Dobbs et al. ................ | 358/500 |
| 5,170,152 A | * | 12/1992 | Taylor ........................ | 345/605 |
| 5,289,295 A | * | 2/1994 | Yumiba et al. ............. | 358/518 |
| 5,384,601 A | * | 1/1995 | Yamashita et al. .......... | 348/577 |
| 5,436,739 A | * | 7/1995 | Imao et al. ................. | 358/518 |
| 5,438,651 A | * | 8/1995 | Suzuki et al. ............... | 345/592 |
| 5,497,431 A | | 3/1996 | Nakamura ................... | 382/162 |
| 5,499,040 A | | 3/1996 | McLaughlin et al. ....... | 345/146 |
| 5,650,942 A | | 7/1997 | Granger ...................... | 364/526 |
| 5,786,906 A | * | 7/1998 | Shishizuka .................. | 358/500 |
| 5,790,261 A | * | 8/1998 | Hayashi et al. ............. | 358/296 |
| 5,943,143 A | * | 8/1999 | Kawai et al. ............... | 358/520 |
| 6,005,969 A | * | 12/1999 | Thomas et al. ............. | 382/162 |
| 6,014,457 A | * | 1/2000 | Kubo et al. ................. | 382/167 |
| 6,028,646 A | * | 2/2000 | Jeong et al. ................ | 348/645 |
| 6,125,199 A | * | 9/2000 | Sato et al. .................. | 382/162 |
| 6,128,001 A | * | 10/2000 | Gonsalves et al. .......... | 345/589 |
| 6,172,681 B1 | * | 1/2001 | Ueda .......................... | 345/589 |
| 6,351,557 B1 | * | 2/2002 | Gonsalves ................... | 382/167 |

FOREIGN PATENT DOCUMENTS

| | | |
|---|---|---|
| DE | 3629403 A1 | 3/1988 |
| EP | 0540313 A2 | 5/1993 |
| JP | 296235 | 11/1989 |

* cited by examiner

*Primary Examiner*—Kee M. Tung
*Assistant Examiner*—Jin-Cheng Wang
(74) *Attorney, Agent, or Firm*—Fitzpatrick, Cella, Harper & Scinto

(57) ABSTRACT

In an image processing apparatus, color balance adjustment information are inputted on the basis of a user instruction, and the brightness of RGB image data having red, green, and blue components is detected. A generation portion maps the image data on a two-dimensional space represented by red and green components and generates rg image data. A target value and a moving factor on the two-dimensional space are set on the basis of the color balance adjustment information and the brightness. A color balance adjustment of the rg image data are performed on the basis of the target value and moving factor. And then the rg image data, which has undergone color balance adjustment, are converted into image data having red, green, and blue components on the basis of the brightness information.

6 Claims, 18 Drawing Sheets

IMAGE PROCESSING APPARATUS AND METHOD AND STORAGE MEDIUM

BACKGROUND OF THE INVENTION

1. Field of the Invention

The present invention relates to an image processing apparatus and method of adjusting color balance, and a storage medium.

2. Related Background Art

Conventional methods of adjusting a color balance shift of a color image or a color input/output device are roughly classified into two methods. In one method, when a color image is represented by the RGB or CMY color space, the color balance is adjusted on the RGB or CMY color space. In the other method, the RGB or CMY color space is temporarily converted into color spaces expressing certain brightness and chromaticity, and the color balances for brightness and chromaticity are independently adjusted in the corresponding color spaces. The adjusted brightness and chromaticity are converted back into the original color space. The first and second methods associated with RGB image data will be described below.

The first adjustment method is expressed by:

$$R' = R + \alpha \quad (1)$$

$$G' = G + \beta \quad (2)$$

$$B' = B + \gamma \quad (3)$$

where $\alpha$, $\beta$, and $\gamma$ are arbitrary positive or negative values.

By changing the values $\alpha$, $\beta$, and $\gamma$, the color balance of an object image can be adjusted.

In the second method, for example, the RGB color space is converted into the L*a*b* color space defined by CIE:

$$RGB \rightarrow L^*a^*b^*$$

(where L* represents brightness and a* and b* represent chromaticity) and adjusted. The following conversion processing is performed on the L*a*b* space:

$$L^{*'} = L^* + \alpha \quad (4)$$

$$a^{*'} = a^* + \beta \quad (5)$$

$$b^{*'} = b^* + \gamma \quad (6)$$

where $\alpha$, $\beta$, and $\gamma$ are arbitrary positive or negative values.

By converting L*' a*' b*' back into R' G' B', L*' a*' b*' →R' G' B' color balance adjustment processing can be realized.

However, in prior art 1, since appropriate adjustment amounts are added to or subtracted from R, G, and B, respectively, the brightness and chromaticity are simultaneously adjusted.

Even when the operator wants to adjust only the chromaticity, the brightness is also adjusted. In addition, in color balance adjustment on the RGB color space, the operator cannot intuitively recognize the destination and amount of color balance adjustment for the entire image, so color balance adjustment directly reflecting the operator's intention for adjustment cannot be performed. Furthermore, since predetermined RGB color balance adjustment is performed on the RGB color space, which is not a uniform color space, independently of the brightness value of object pixel data, the apparent adjustment amount changes depending on the brightness.

In prior art 2, since color balance is adjusted after the RGB color space is converted into spaces expressing the brightness and chromaticity, the brightness and chromaticity can be independently adjusted. This allows direct reflection of the operator's intention for adjustment. However, conversion from the RGB color space into the color spaces expressing the brightness and chromaticity requires a long time.

In prior arts 1 and 2, since the operator cannot recognize the position of a set adjustment amount in the entire adjustment space, he/she cannot know the degree of adjustment based on the adjustment amount defined by himself/herself.

SUMMARY OF THE INVENTION

The present invention has been made in consideration of the above situation, and has as its first object to adjust color balance without any brightness/chromaticity conversion which takes a long processing time, and with substantially no change in brightness.

It is the second object of the present invention to perform color balance adjustment corresponding to the human visual characteristics with a simple arrangement by adjusting color balance in response to the brightness of image data.

In order to achieve the above objects, corresponding to the present invention, there is provided an image processing apparatus comprising:

input means for inputting color balance adjustment information on the basis of a user instruction;

detection means for detecting brightness of RGB image data having red, green, and blue components;

generation means for mapping the image data on a two-dimensional space represented by red and green components to generate rg image data;

setting means for setting a target value and a moving factor on the two-dimensional space on the basis of the color balance adjustment information and the brightness;

color balance adjustment means for performing color balance adjustment of the rg image data on the basis of the target value and moving factor; and conversion means for converting the rg image data, which has undergone color balance adjustment, into image data having red, green, and blue components on the basis of the brightness information.

There is also provided an image processing apparatus comprising:

input means for inputting RGB image data having red, green, and blue components;

calculation means for calculating a sum value of values of the red, green, and blue components;

color balance adjustment processing means for performing color balance adjustment processing for the red and green components of the RGB image data on a two-dimensional space represented by red and green components; and means for obtaining a blue component on the basis of the sum value and the red and green components which have undergone color balance adjustment processing.

There is also provided an image processing apparatus comprising:

input means for inputting image data having N color components;

detection means for detecting brightness of the image data;

calculation means for calculating a sum value of values of the N color components;

color balance adjustment processing means for performing color balance adjustment processing in response to the brightness on an M-dimensional space represented by M color components (M<N) of the N color components; and generation means for generating image data having the N color components, which has undergone color balance adjustment, on the basis of the sum value and the M color components which have undergone color balance adjustment processing.

Other objects, features, and advantages of the present invention will be apparent from the following detailed description of embodiments taken in conjunction with the accompanying drawings.

DESCRIPTION OF THE PREFERRED EMBODIMENTS

First Embodiment

Figure 1:
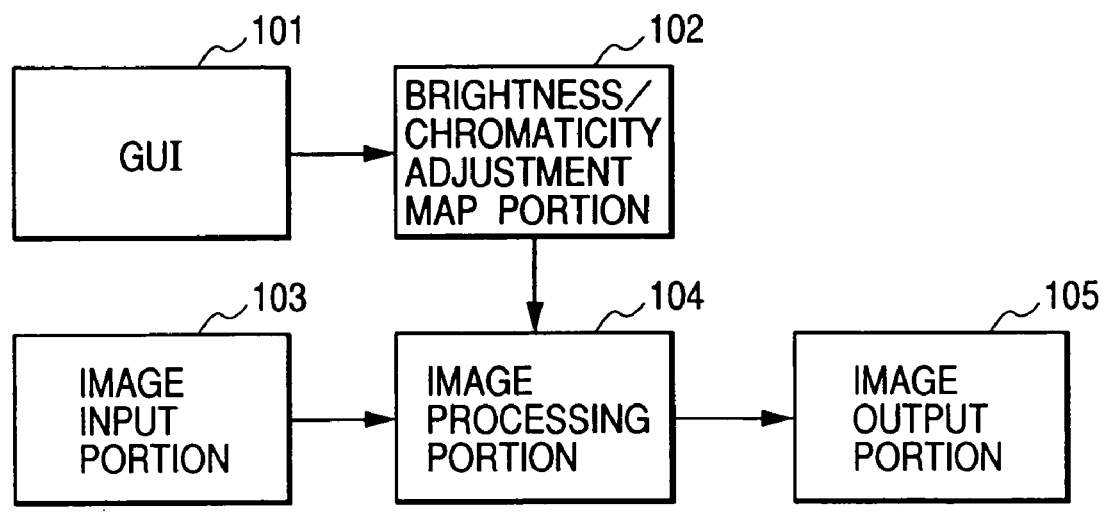
FIG. 1 is a block diagram showing the system arrangement.

FIG. 1 is a block diagram showing the arrangement of a system to which the present invention is applied. Referring to FIG. 1, a graphical user interface (to be referred to as a GUI hereinafter) 101 controls an image processing apparatus. A brightness/chromaticity adjustment map portion 102 sends an adjustment amount for color balance adjustment processing to an image processing portion 104 in response to a cell designated by the GUI 101. An image input portion 103 transfers object image data to the image processing portion 104. The image processing portion 104 processes the image data from the image input portion 103 to perform color balance adjustment based on the adjustment amount from the brightness/chromaticity adjustment map portion 102, and transfers the processing result to an image output portion 105. The image output portion 105 outputs the image data processed by the image processing portion 104. In this embodiment, the operator designates the adjustment amount (brightness/chromaticity adjustment map 102) for color balance adjustment processing using the GUI 101, and image data from the image input portion 103 is processed by the image processing portion 104 on the basis of the designation result and is transferred to the image output portion 105.

Figure 2:
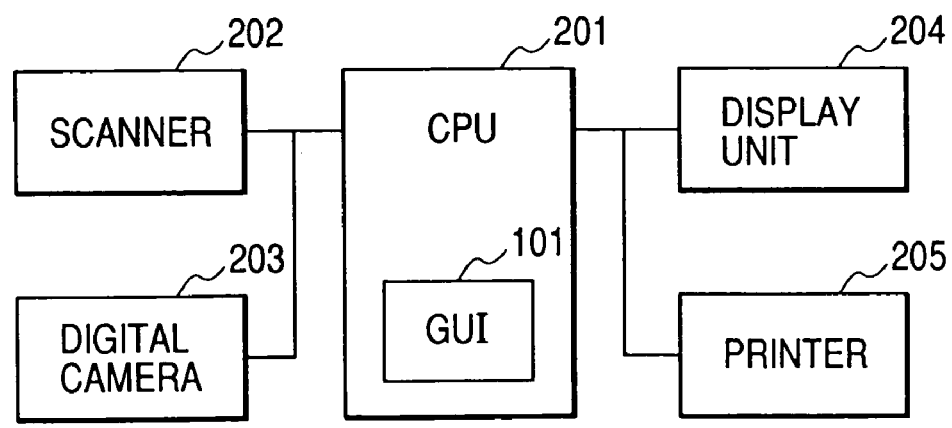
FIG. 2 is a block diagram showing the system arrangement.

FIG. 2 shows a specific example realizing the system shown in FIG. 1. In this embodiment, there are two implementation forms: software and hardware, and two modes: image input mode and image output mode, i.e., a total of four combinations. Software such as the GUI 101 is installed in a computer 201. A scanner 202 and a digital camera 203 are input devices for receiving image data to be processed. A display unit 204 and a printer 205 are output devices for displaying or printing the image data which has undergone color balance processing.

The four specific implementation forms will be described below.

[Implementation by Software]

(Input Mode)

Image data input from the scanner 202 or digital camera 203 is transferred to the computer 201. In the computer 201, the image data is subjected to color balance adjustment processing by software on the basis of an adjustment amount from the brightness/chromaticity adjustment map portion 102 designated by the GUI 101. The processed image data is displayed by the display unit 204, printed by the printer 205, or stored in the computer 201 as a file.

(Output Mode)

Image data which has already been input to the computer 201 is subjected to color balance adjustment processing by software in the computer 201 on the basis of an adjustment amount from the brightness/chromaticity adjustment map portion 102 designated by the GUI 101. The processed image data is displayed by the display unit 204, printed by the printer 205, or stored in the computer 201 as a file.

[Implementation by Hardware]

(Input Mode)

An adjustment amount from the brightness/chromaticity adjustment map portion 102 designated by the GUI 101 in the computer 201 is transferred to the scanner 202 or digital camera 203. In the scanner 202 or digital camera 203, image data is subjected to color balance adjustment processing by hardware on the basis of the adjustment amount, and the result is transferred to the computer 201.

(Output Mode)

An adjustment amount from the brightness/chromaticity adjustment map portion 102 designated by the GUI 101 in the computer 201 is transferred to the display unit 204 or printer 205. The device displays or prints image data which has undergone color balance adjustment processing by internal hardware on the basis of the adjustment amount.

The arrangement implemented by hardware will be described below in detail.

Figure 3:
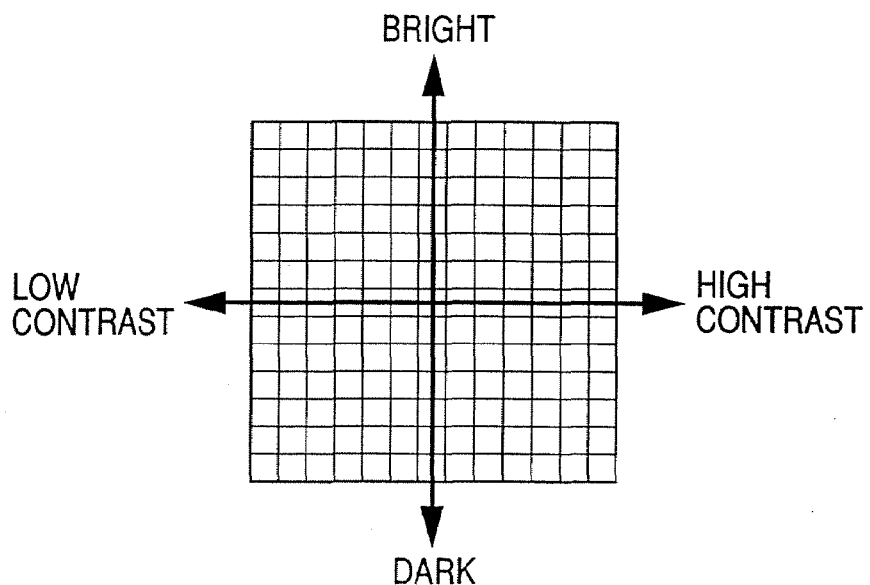
FIG. 3 is a view showing the brightness adjustment map.

FIG. 3 shows a brightness adjustment map. By selecting one of the cells on the brightness adjustment map by the GUI 101, brightness (L) and contrast (C) for brightness adjustment are designated. The map size is 2×n+1 (n is an integer). In this embodiment, since n=6, the map size is 13×13. The ordinate represents the brightness, and 13 steps of brightness from −6 to −1, 0, +1 to +6, i.e., from "dark" to "bright" can be designated. When the brightness is 0, brightness adjustment is not performed. The abscissa represents the contrast, and 13 steps of contrast from −6 to −1, 0, +1 to +6, i.e., from "low contrast" to "high contrast" can be designated. When the contrast is 0, contrast adjustment is not performed. For example, assume that a cell (+3,−6) of the brightness adjustment map is designated by the GUI 101. This designation means that brightness balance adjustment based on a combination of contrast C=+3 and brightness L=−6 is to be performed.

Figure 4:
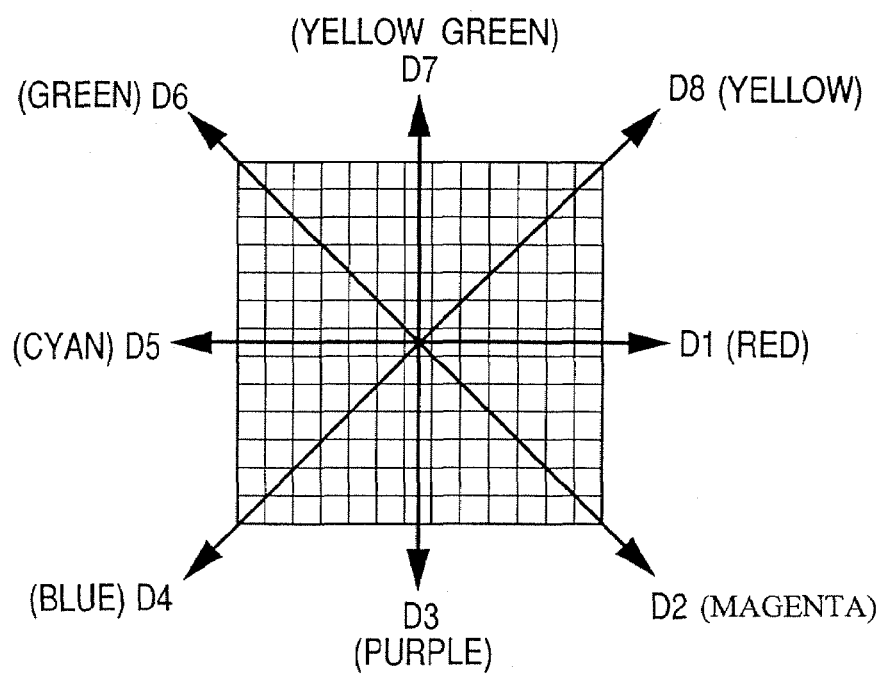
FIG. 4 is a view showing the chromaticity adjustment map.

FIG. 4 shows a chromaticity adjustment map. By selecting one of the cells on the chromaticity adjustment map by the GUI 101, color destination [Destination Color Points (Dr, Dg)] and an adjustment amount [moving factor (m)] are designated. The map size is 13×13, as in FIG. 3. In the chromaticity adjustment map, eight Destination basic colors D1 to D8 centered on a cell (0,0) are set. Colors between the basic colors are set by color interpolation. In this embodiment, the basic colors D1 to D8 are set as red, magenta, purple, blue, cyan, green, yellowgreen, and yellow, respectively. More specifically, cells (+1,0), (+2,0), . . . , (+6,0) designate "red" as the color balance adjustment destination. The adjustment amount [moving factor (m)] increases as the cells (+1,0), (+2,0), . . . , (+6,0) separate from the center. For cells between D1 [(+1,0), (+2,0), . . . , (+6,0)] and D2 [(+1,−1), (+2,−2), . . . , (+6,−6)], the Destination Color Points (Dr, Dg) are set by interpolation using D1 (red) and D2 (magenta).

In brightness/chromaticity color balance adjustment, two-dimensional brightness/chromaticity adjustment maps representing adjustment ranges are prepared to control the brightness/chromaticity color balance adjustment amounts in a one-to-one correspondence with cells on the adjustment maps. Hence, the operator can easily estimate the result of designated adjustment.

The above color setting method will be described next with reference to FIG. 5. In the present invention, after RGB image data is converted into an rgb space represented by:

$$r=R/(R+G+B) \quad (7)$$

$$g=G/(R+G+B) \quad (8)$$

$$b=B/(R+G+B) \quad (9)$$

color balance adjustment processing is executed.

Since $$r+g+b=1 \quad (10)$$

b can be obtained when r and g are uniquely defined.

Figure 5:
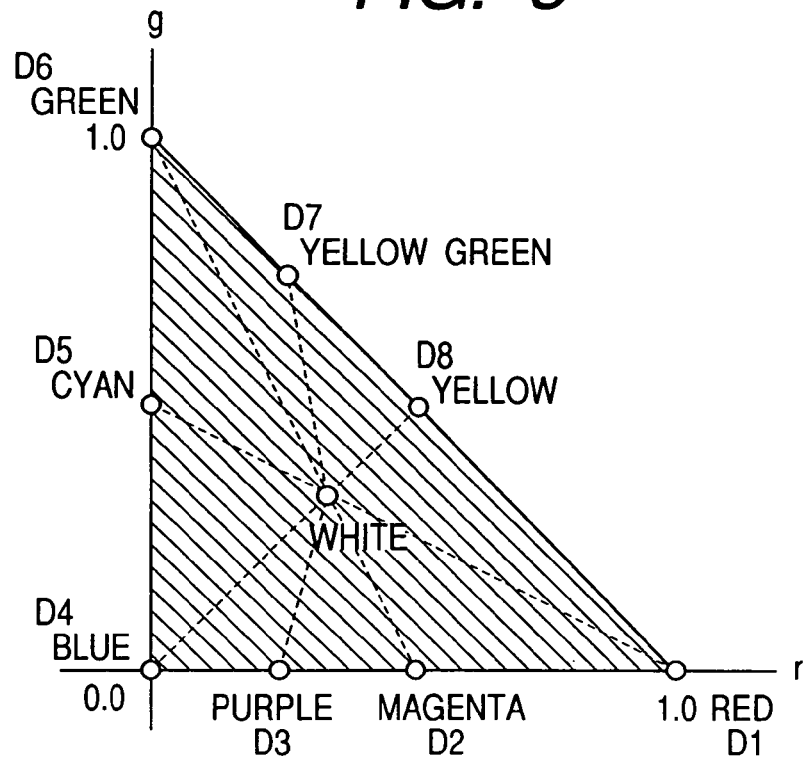
FIG. 5 is a chromaticity diagram showing the rg chromaticity coordinates of eight basic colors in the adjustment destinations shown in FIG. 4.

The present invention realizes chromaticity color balance adjustment using only an rg space shown in FIG. 5. Referring to FIG. 5, the rg space is represented within the triangular range represented by halftone dots. "White" is set at the center of the triangle. Saturation increases toward each side of the triangle. The Destination Color Points of the eight basic colors in FIG. 4 are

[Dr, Dg]
D1: red=[1.0, 0.0]
D2: magenta=[0.5, 0.0]
D3: purple=[0.25, 0.0]
D4: blue=[0.0, 0.0]
D5: cyan=[0.0, 0.5]
D6: green=[0.0, 1.0]
D7: yellowgreen=[0.25, 0.75]
D8: yellow=[0.5, 0.5]

Figure 6:
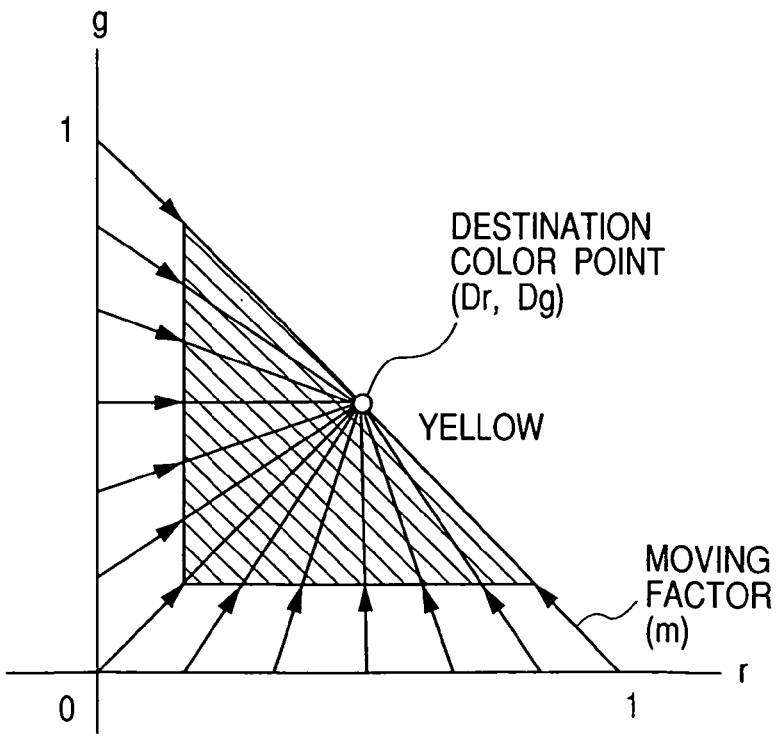
FIG. 6 is a graph showing rg color space adjustment when Destination Color Points (Dr, Dg) and a moving factor (m) are given.

FIG. 6 shows color balance adjustment when cells (+1,+1), (+2,+2), . . . , (+6,+6) of D8 (yellow) are selected. The whole rg space moves from the triangle with vertices "red", "green", and "blue" to a smaller triangle represented by halftone dots, i.e., the rg space moves toward D8 (yellow) by the moving factor (m). Movement of (r, g) to (r', g') is represented by:

$$r'=r+(r-Dr)*m \quad (11)$$

$$g'=g+(g-Dg)*m \quad (12)$$

As the coordinates of a selected cell move outward [(+1,+1), (+2,+2), . . . , (+6,+6)], the value of the moving factor (m) increases. As is apparent from equations (10) and (11), as the coordinates of the selected cell separate from the center, the color balance adjustment amount increases.

Figure 7:
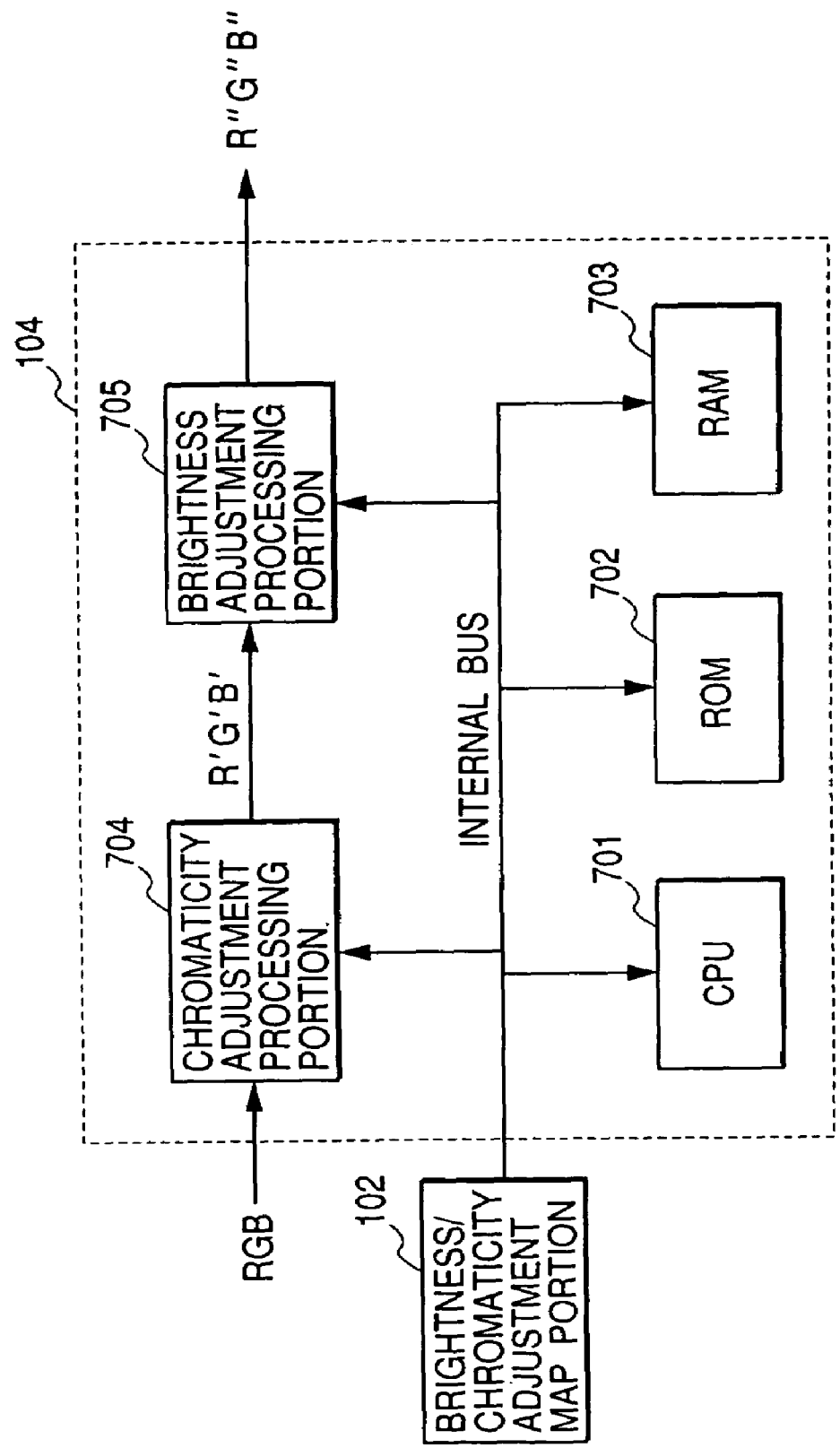
FIG. 7 is a block diagram showing the arrangement of an image processing portion 104 (FIG. 1) for adjusting the color balance of brightness/chromaticity.

FIG. 7 is a block diagram for explaining the image processing portion 104 for realizing processing contents described with reference to FIGS. 3 to 6. Referring to FIG. 7, a CPU 701 is a controller for controlling the image processing portion 104. The processing contents of the CPU 701 are described in a ROM 702. A RAM 703 is used as a work area of the CPU 701. A chromaticity adjustment processing portion 704 and a brightness adjustment processing portion 705 adjust chromaticity and brightness in color balance adjustment, respectively. On the basis of the processing contents stored in the ROM 702, the CPU 701 communicates with the brightness/chromaticity adjustment map portion 102, sets the values of brightness (L) and contrast (C) corresponding to a brightness cell designated by the GUI 101 in the brightness adjustment processing portion 705, and sets the values of Destination Color Points (Dr, Dg) and moving factor (m) corresponding to a chromaticity cell in the chromaticity adjustment processing portion 704. In response to the set values, the chromaticity adjustment processing portion 704 and brightness adjustment processing portion 705 adjust the chromaticity and brightness of sequentially input RGB image data, respectively.

Figure 8:
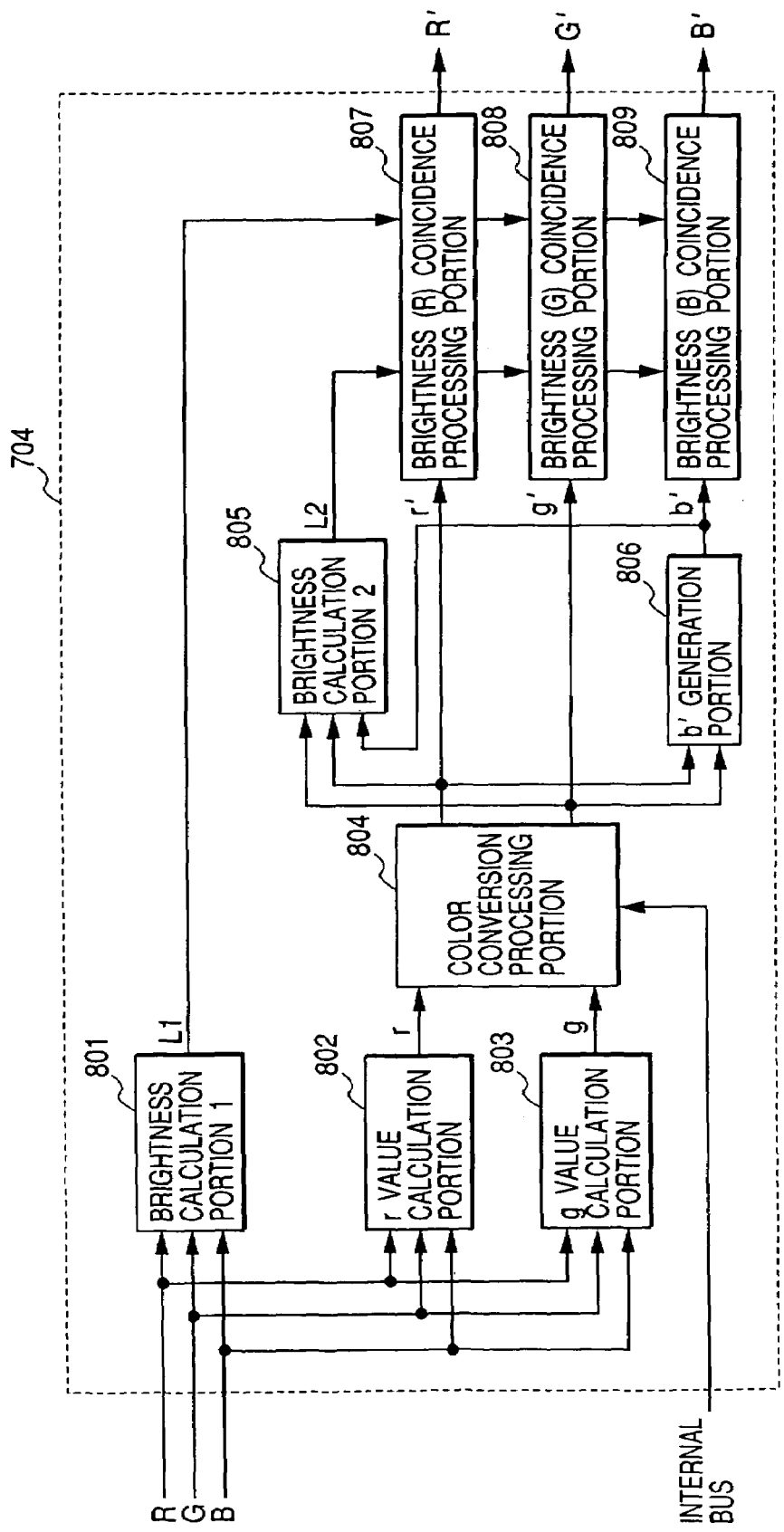
FIG. 8 is a block diagram showing the arrangement of a chromaticity adjustment processing portion 704 shown in FIG. 7.

FIG. 8 is a block diagram for explaining the processing contents of the chromaticity adjustment processing portion 704 shown in FIG. 7 in detail. Referring to FIG. 8, a brightness calculation portion 1-801 calculates the brightness of input image data RGB given by:

$$L1=0.30*R+0.59*G+0.11*B \quad (13)$$

The result L1 is sent to a brightness (R) coincidence processing portion 807, a brightness (G) coincidence processing portion 808, and a brightness (B) coincidence processing portion 809. An r value calculation portion 802 calculates equation (7). A g value calculation portion 803 calculates equation (8). The results r and g are transferred to a color conversion processing portion 804. The color conversion processing portion 804 calculates equations (11) and (12) using the information (Dr, Dg, m) of a cell selected in the brightness/chromaticity adjustment map portion 102 to obtain r' and g' (the arrangement of the color conversion processing portion 804 will be described later in detail with reference to a block diagram shown in FIG. 9). On the basis of r' and g', a b' generation portion 806 calculates $$b'=1-r'-g' \quad (14)$$

to obtain b'. A brightness calculation portion 2-805 performs the same arithmetic processing as equation (13) using the results (r', g', b') from the color-conversion processing portion 804 and b' generation portion 806 and outputs a result L2. The result L2 is sent to the brightness (R) coincidence processing portion 807, brightness (G) coincidence processing portion 808, and brightness (B) coincidence processing portion 809. Using r', g', b', L1, and L2, the brightness (R) coincidence processing portion 807, brightness (G) coincidence processing portion 808, and brightness (B) coincidence processing portion 809 perform brightness coincidence processing represented by $$R'=r'*L1/L2 \quad (15)$$

$$G'=g'*L1/L2 \quad (16)$$

$$B'=b'*L1/L2 \quad (17)$$

to obtain R', G', and B', respectively.

Figure 9:
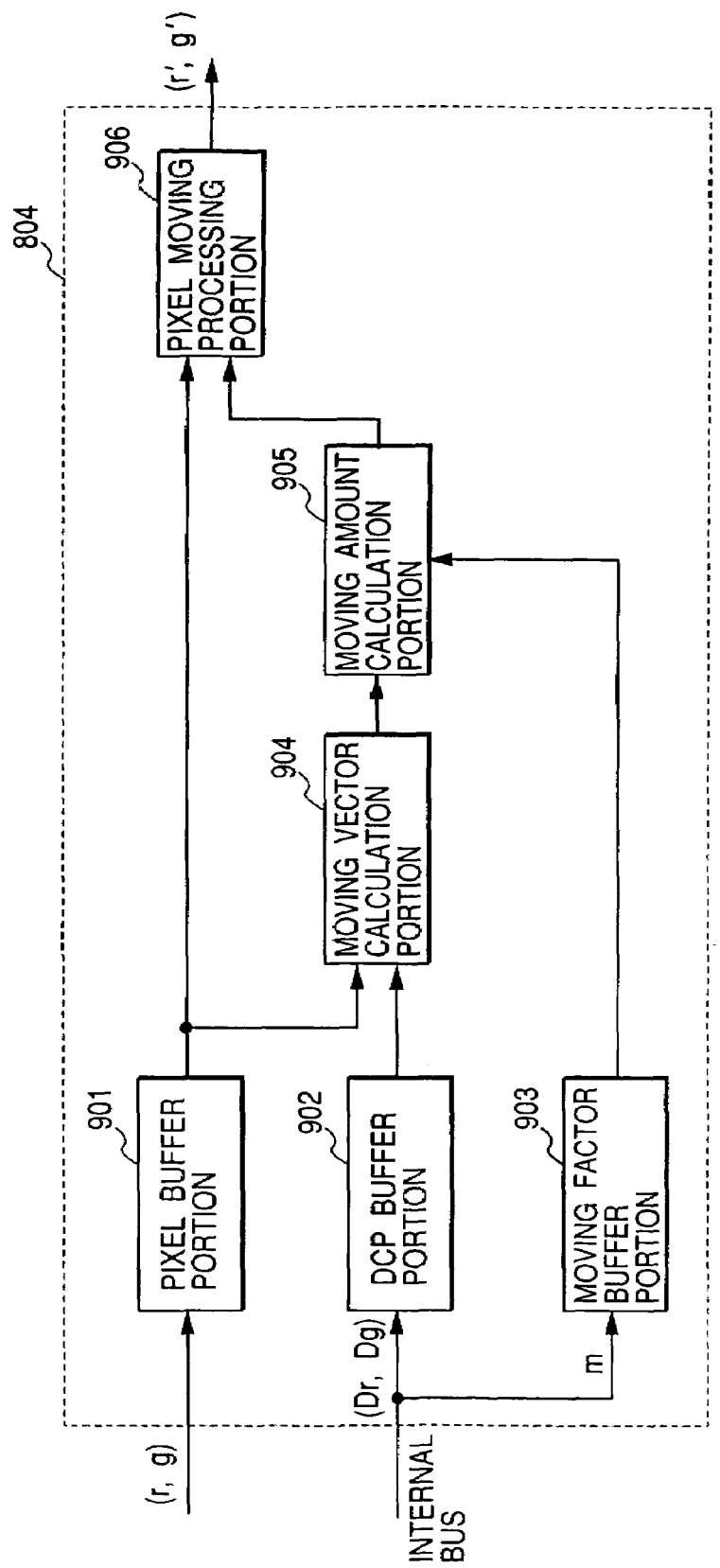
FIG. 9 is a block diagram showing the arrangement of a color conversion processing portion 804 shown in FIG. 8.

FIG. 9 is a block diagram for explaining the arrangement of the color conversion processing portion 804. Referring to FIG. 9, a pixel buffer portion 901 temporarily stores the values r and g from the r value calculation portion 802 and g value calculation portion 803. A DCP buffer portion 902 temporarily stores the values of Destination Color Points (Dr, Dg) from the brightness/chromaticity adjustment map portion 102. A moving factor buffer portion 903 temporarily stores the moving factor (m) from the brightness/chromaticity adjustment map portion 102. A moving vector calculation portion 904 calculates moving vectors (r–Dr, g–Dg) from (r, g) in the pixel buffer portion 901 and (Dr, Dg) in the DCP buffer portion 902. A moving amount calculation portion 905 multiplies (r–Dr, g–Dg) from the moving vector calculation portion 904 by the moving factor (m) in the moving factor buffer portion 903 to obtain moving amounts (m*(r–Dr), m*(g–Dg)). A pixel moving processing portion 906 calculates (r', g') represented by equations (11) and (12) from (r, g) in the pixel buffer portion 901 and (m*(r–Dr), m*(g–Dg)) from the moving amount calculation portion 905.

As described above, the chromaticity adjustment processing portion 704 performs chromaticity color balance adjustment to obtain (R', G', B'). Each of R', G', and B' is subjected to brightness and contrast adjustment processing on the basis of brightness (L) and contrast (C) from the brightness adjustment map to obtain R", G", and B".

The (R", G", B") whose color balances are adjusted by the brightness adjustment processing portion 705 are transferred to the image output portion 105 shown in FIG. 1 and output, i.e., displayed, printed, or written as a file.

As described above, when the color balance adjustment amount is set in response to the position on the brightness/chromaticity adjustment map, the operator can easily locate the position of the set adjustment amount in the entire adjustment space, so desired color balance adjustment can be easily performed. In addition, color balance adjustment is performed after the RGB space is converted into the rg space. For this reason, chromaticity color balance adjustment processing can be realized without conversion from the RGB color space into the L*a*b* color space, which has been described in association with prior art 2 and requires a long processing time, and with substantially no change in chromaticity. Furthermore, since conversion from the RGB space into the rg space can be implemented by a simpler arrangement than that for conversion from the RGB space to the L*a*b* space, the hardware scale can be largely reduced.

Second Embodiment

In the first embodiment, chromaticity color balance adjustment is performed independently of the value of brightness of an object pixel, as described with reference to FIG. 9. In the second embodiment, an apparatus capable of controlling the chromaticity adjustment amount of a pixel on the basis of brightness will be described with reference to FIGS. 10 and 11.

Figure 10:
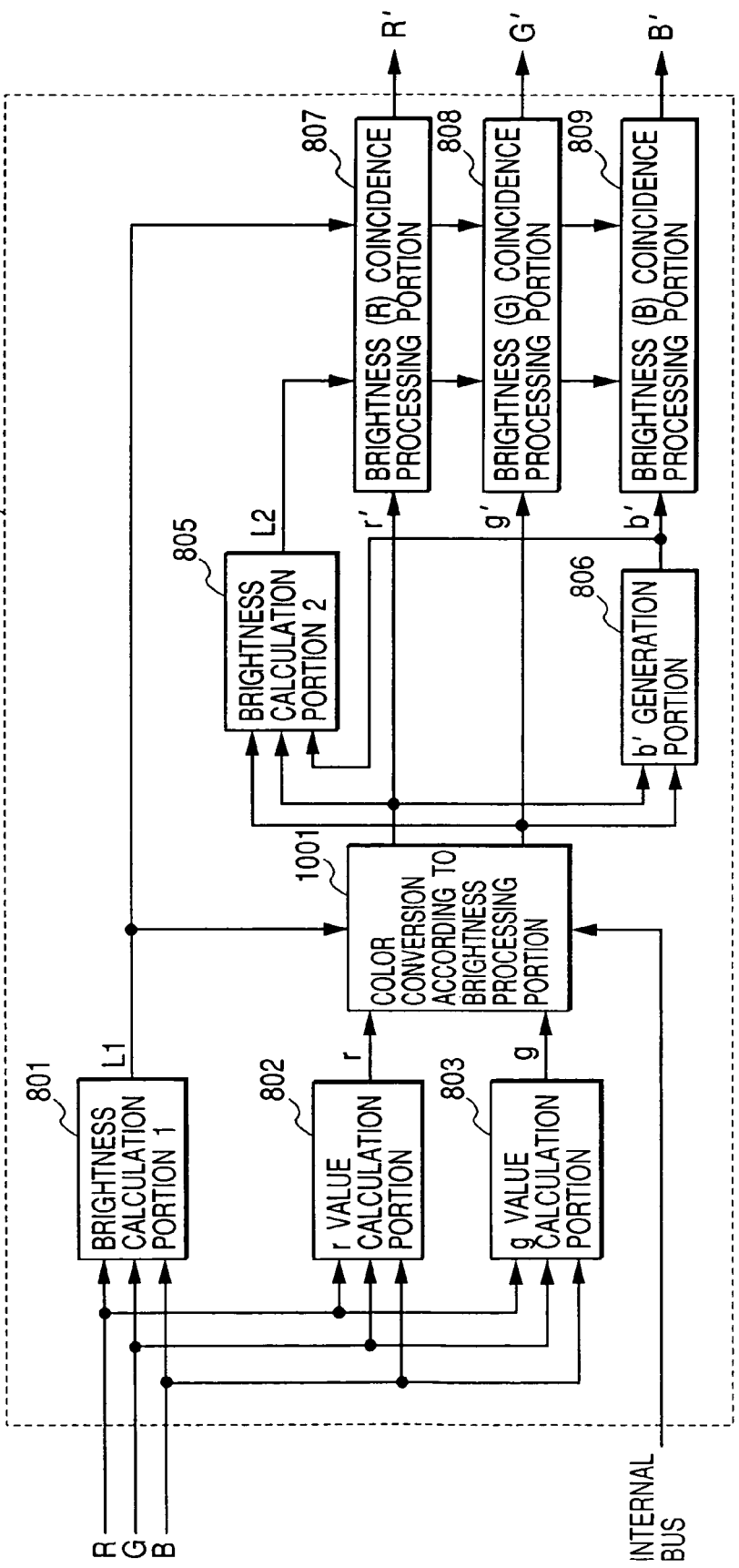
FIG. 10 is a block diagram showing the arrangement of a chromaticity adjustment processing portion 704 capable of color conversion processing corresponding to brightness, like in FIG. 8.

Referring to FIG. 10, a brightness calculation portion 1-801, an r value calculation portion 802, a g value calculation portion 803, a brightness calculation portion 2-805, a b' generation portion 806, a brightness (R) coincidence processing portion 807, a brightness (G) coincidence processing portion 808, and a brightness (B) coincidence processing portion 809 are the same as those in FIG. 8, and a detailed description thereof will be omitted. FIG. 10 is different from FIG. 8 in that a color conversion corresponding to brightness processing portion 1001 is used in place of the color conversion processing portion 804, and the value of brightness L1 from the brightness calculation portion 1-801 is supplied to the color conversion corresponding to brightness processing portion 1001.

Figure 11:
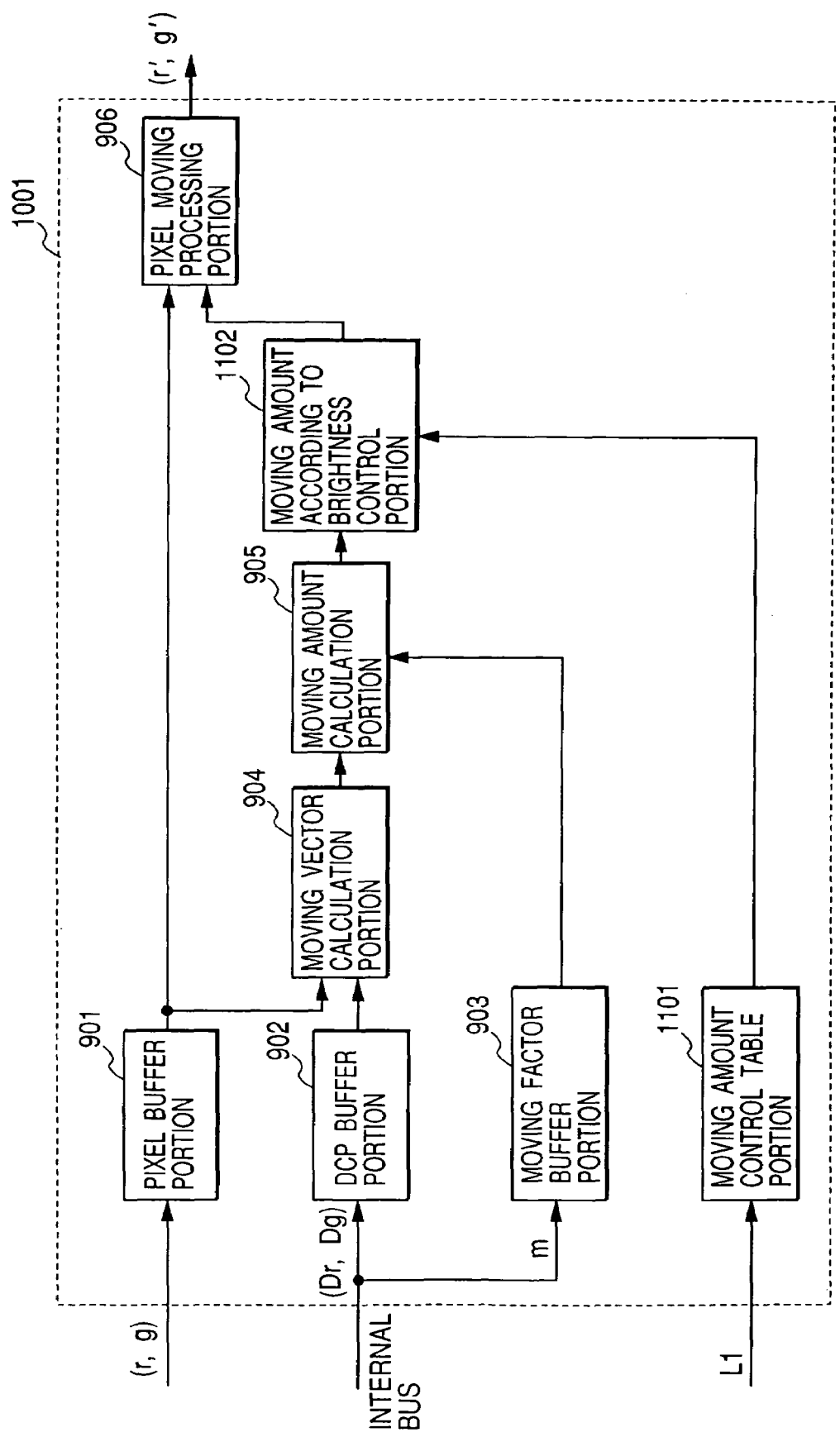
FIG. 11 is a block diagram showing the arrangement of a color conversion corresponding to brightness processing portion 1001 shown in FIG. 10.
Figure 15:
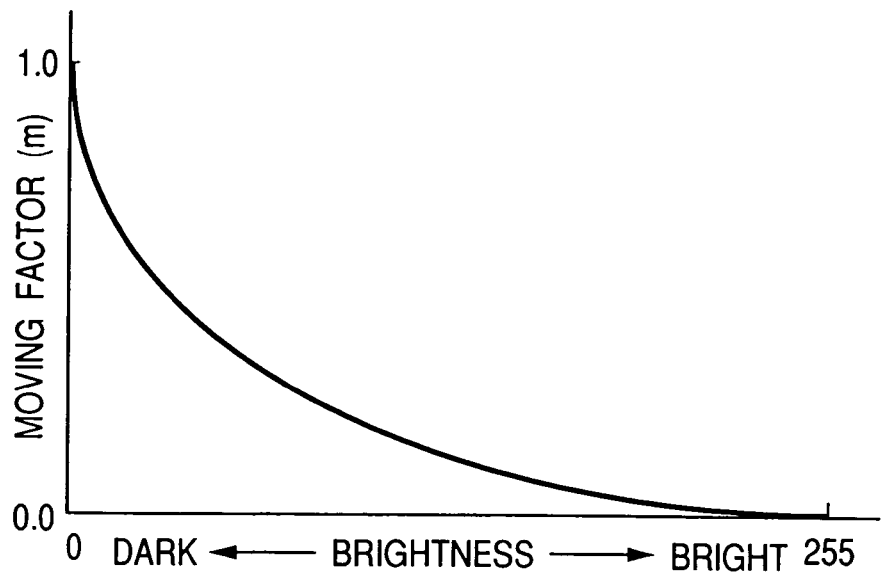
FIG. 15 is a graph showing the contents of a moving amount control table portion 1101 shown in FIG. 11 so as to explain the reverse characteristics of human visual characteristics.

FIG. 11 is a block diagram for explaining the arrangement of the color conversion corresponding to brightness processing portion 1001. Referring to FIG. 11, a pixel buffer portion 901, a DCP buffer portion 902, a moving factor buffer portion 903, a moving vector calculation portion 904, and a moving amount calculation portion 905 are the same as those in FIG. 9, and a detailed description thereof will be omitted. A table representing the reverse characteristics of human visual characteristics as shown in FIG. 15 is set in a moving amount control table portion 1101. In the moving amount control table portion 1101, an address of the table is designated on the basis of the brightness L1 from the brightness calculation portion 1-801. A value S (L1) corresponding to the address is output and transferred to a moving amount corresponding to brightness control portion 1102. On the basis of (m*(r–Dr), m*(g–Dg)) from the moving amount calculation portion 905 and S(L1) from the moving amount control table portion 1101, the moving amount corresponding to brightness control portion 1102 performs processing represented by $$(S(L1)*m*(r-Dr), S(L1)*m*(g-Dg)) \quad (18)$$

and transfers the result to the pixel moving processing portion 906. The pixel moving processing portion 906 executes processing represented by $$r'=r+S(L1)*m*(r-Dr) \quad (19)$$

$$g'=g+S(L1)*m*(g-Dg) \quad (20)$$

to obtain r' and g'.

By this chromaticity color balance adjustment processing, adjustment processing can be realized without changing the apparent adjustment amount between pixels with different brightness. More specifically, since adjustment processing is performed corresponding to the brightness of an input pixel, uniform balance adjustment corresponding to the human visual characteristics can be realized although the adjustment is performed on the RGB color space.

When the moving amount control table portion shown in FIG. 15 is prepared in consideration of characteristics corresponding to the input/output devices shown in FIG. 2, color balance shifts of the input/output devices can be accurately adjusted.

Third Embodiment

In the first embodiment, the arrangement implemented by hardware has been described in detail. In the third embodiment, an arrangement implemented by software will be described in detail.

Figure 12:
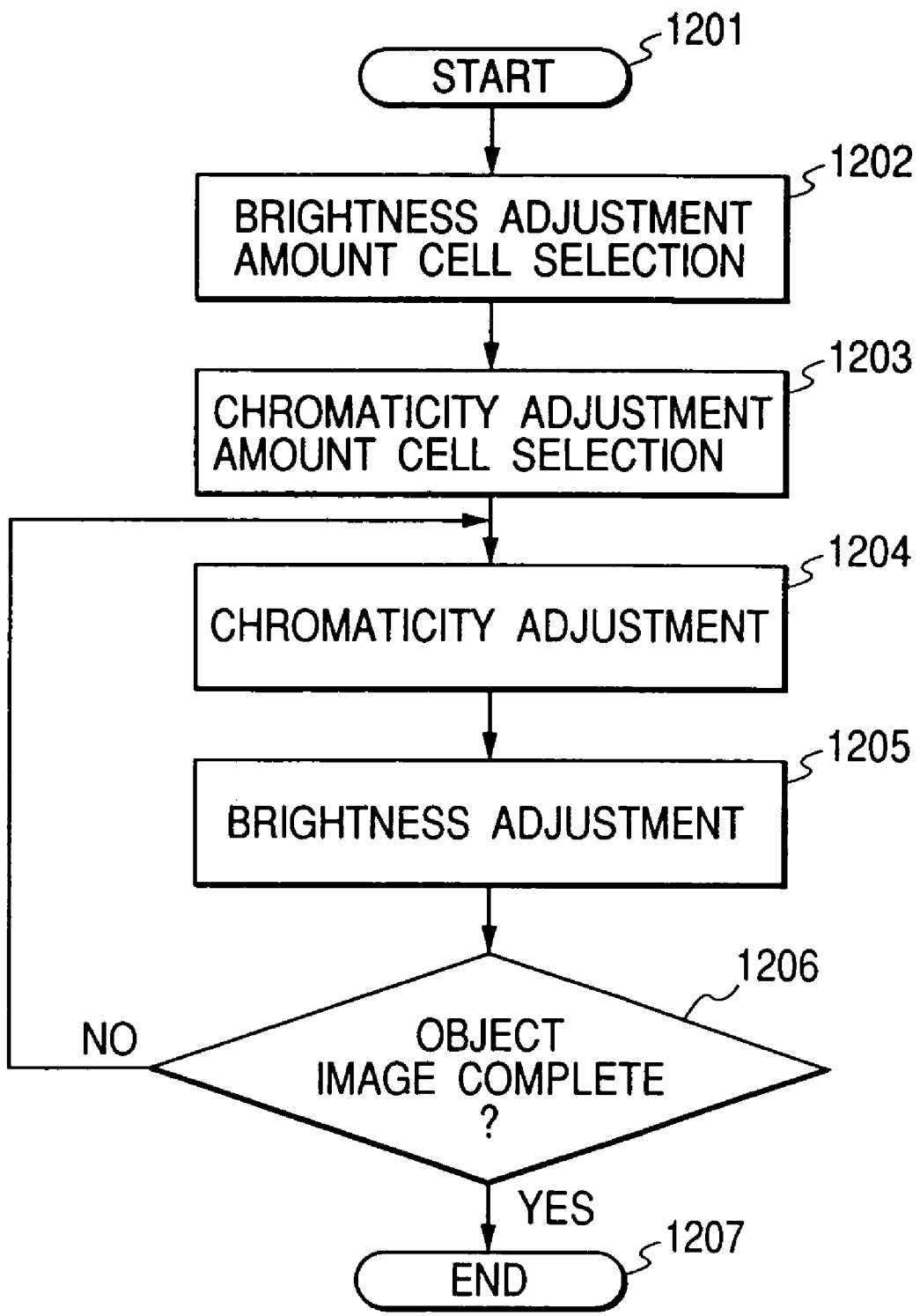
FIG. 12 is a flow chart of software for implementing the present invention.

FIG. 12 is a flow chart of software for implementing the arrangement shown in FIG. 1. Steps 1202 and 1203 correspond to processing performed in a GUI 101 and a brightness/chromaticity adjustment map portion 102 shown in FIG. 1. Steps 1204, 1205, and 1206 correspond to processing in an image input portion 103, an image processing portion 104, and an image output portion 105. Step 1201 is the start step of the software processing. Step 1202 is a brightness adjustment amount cell selection step of selecting a brightness adjustment amount cell of the brightness/chromaticity adjustment map portion 102 using the GUI 101. Step 1203 is a chromaticity adjustment amount cell selection step of selecting a chromaticity adjustment amount cell of the brightness/chromaticity adjustment map portion 102 using the GUI 101. Step 1204 is a chromaticity adjustment step of adjusting the chromaticity of pixel data from the image input portion 103 using the values of Destination Color Points (Dr, Dg) and moving factor (m) corresponding to the cell selected in the chromaticity adjustment amount cell selection step 1203 (the processing contents will be described later in detail with reference to FIG. 13). Step 1205 is a brightness adjustment step of adjusting the brightness of the pixel data which has undergone chromaticity adjustment using the values of brightness (L) and contrast (C) corresponding to the cell selected in the brightness adjustment amount cell selection step 1202. The pixel data which has undergone brightness adjustment is sent to the image output portion 105. Step 1206 is a step of determining whether the object image is complete. If NO in step 1206, the flow returns to step 1204 to continue processing; otherwise, the flow advances to step 1207 to end processing.

Figure 13:
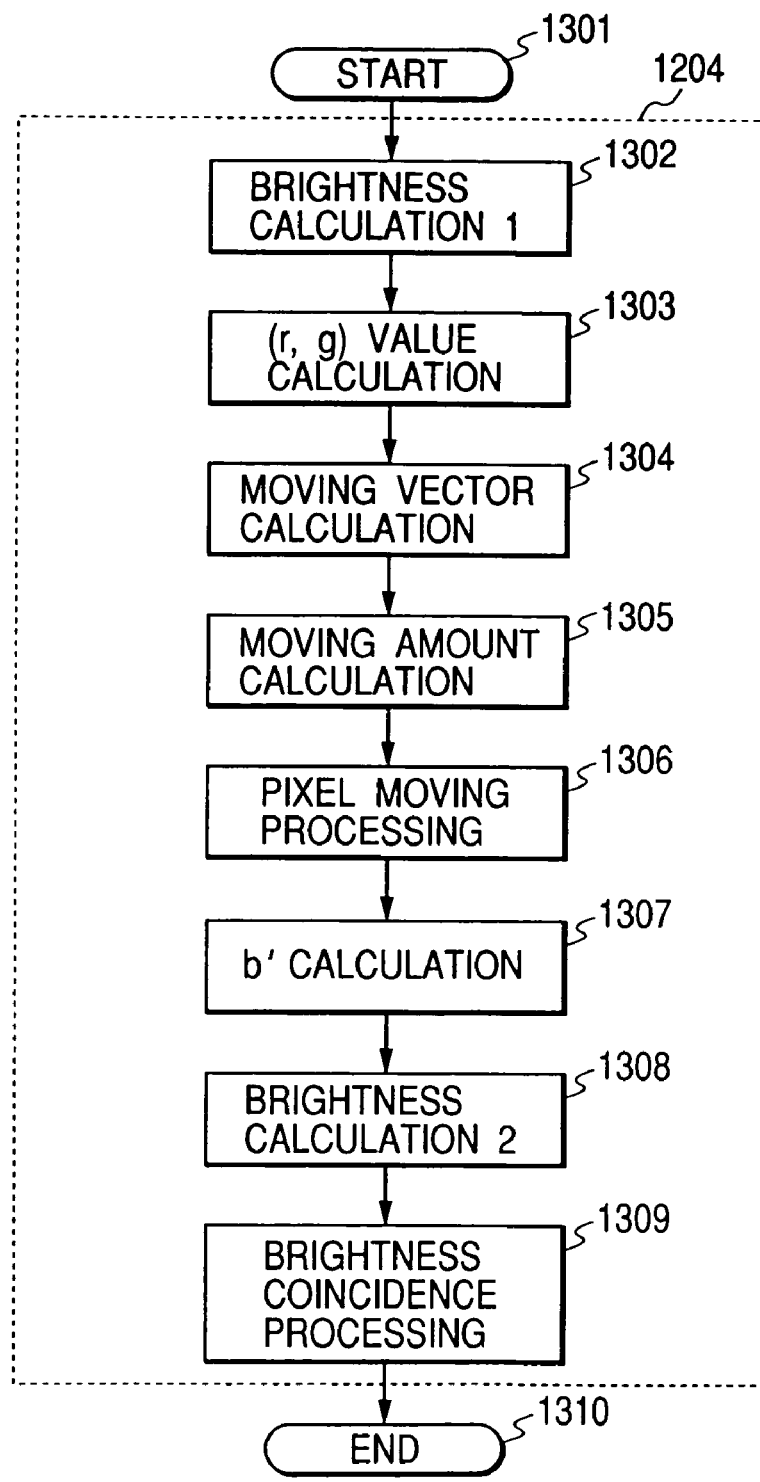
FIG. 13 is a flow chart of the chromaticity adjustment step 1204 shown in FIG. 12.

FIG. 13 is a flow chart for explaining the processing contents of the chromaticity adjustment step 1204 in detail. FIG. 13 explains an arrangement for implementing the same processing contents as in the first embodiment shown in FIGS. 8 and 9 by software. Referring to FIG. 13, step 1302 is a brightness calculation 1 step of calculating brightness L1 represented by equation (13). Step 1303 is an (r, g) value calculation step of executing processing represented by equations (7) and (8) to obtain the values r and g. Step 1304 is a moving vector calculation step of calculating moving vectors (r–Dr, g–Dg) from (r, g) obtained in the (r, g) value calculation step 1303 and the Destination Color Points (Dr, Dg) obtained in the chromaticity adjustment amount cell selection step 1203. Step 1305 is a moving amount calculation step of calculating moving amounts (m*(r–Dr), m*(g–Dg)) from the moving vectors (r–Dr, g–Dg) from the moving vector calculation step 1304 and the moving factor (m) obtained in the chromaticity adjustment amount cell selection step 1203. Step 1306 is a pixel moving processing step of obtaining (r', g') represented by equations (11) and (12) from the values (r, g) obtained in the (r, g) value calculation step and the moving amounts (m*(r–Dr), m*(g–Dg)) obtained in the moving amount calculation step 1305. Step 1307 is a b' calculation step of calculating a value b' represented by equation (14) from (r', g') obtained in the pixel moving processing step 1306. Step 1308 is a brightness calculation 2 step of calculating L2 by the same processing as that represented by equation (13) using (r', g', b') obtained in the pixel moving processing step 1306 and b' calculation step 1307. Step 1309 is a brightness coincidence processing step of performing coincidence processing of brightness represented by equations (15), (16), and (17) using r', g', b', L1, and L2 obtained in the brightness calculation 1 step 1302, pixel moving processing step 1306, b' calculation step 1307, and brightness calculation 2 step 1308 to obtain (R', G', B').

As described above, by using the flow charts shown in FIGS. 12 and 13, the same color balance adjustment processing as in the first embodiment can be implemented by software.

Fourth Embodiment

In the second embodiment, the chromaticity color balance adjustment amount is controlled on the basis of the brightness value of a pixel using hardware. In the fourth embodiment, this arrangement is implemented by software.

Figure 14:
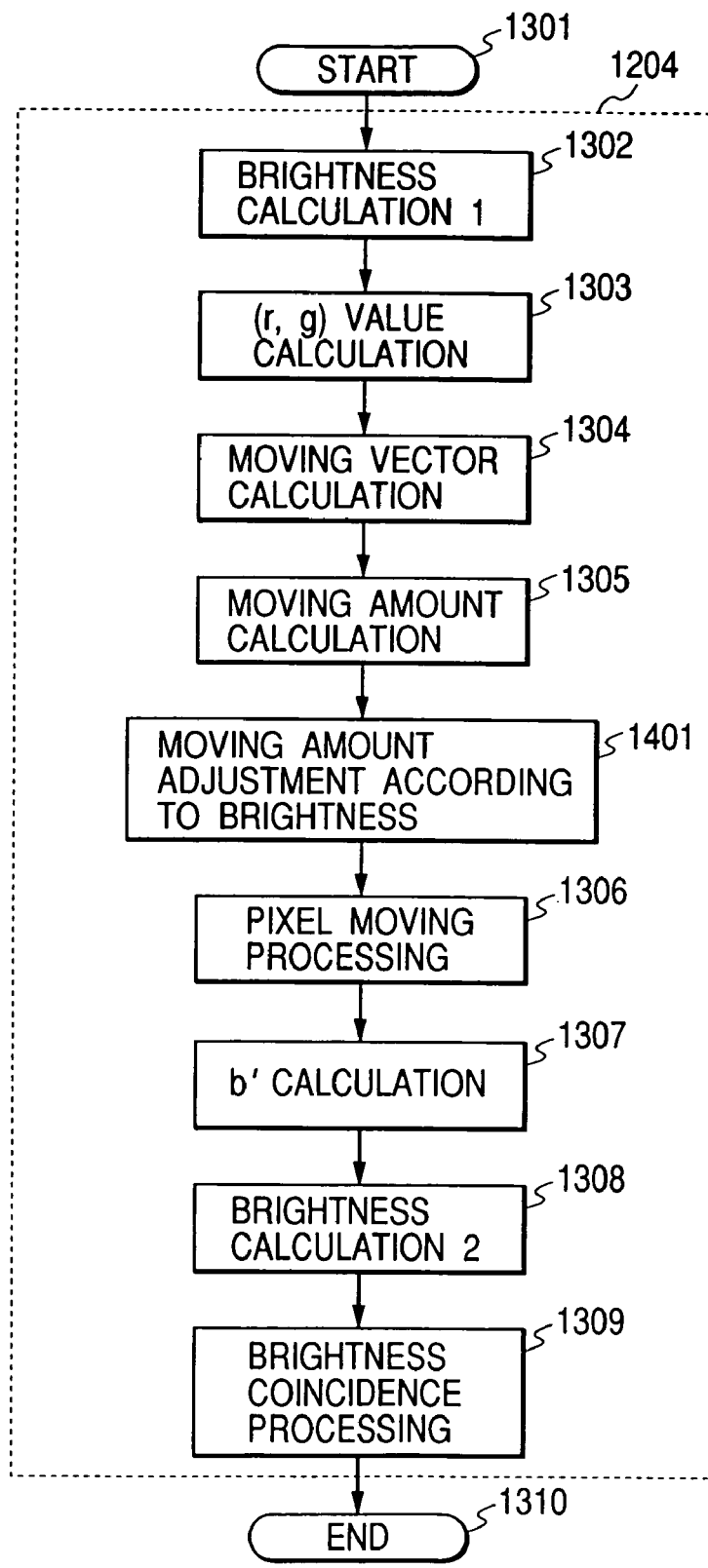
FIG. 14 is a flow chart of the chromaticity adjustment step 1204 (FIG. 12) capable of moving amount adjustment corresponding to brightness, like in FIG. 13.

In FIG. 14, the moving amount adjustment corresponding to brightness step 1401 is added to the chromaticity adjustment step 1204 shown in FIG. 13. Steps 1302 to 1305 are the same as those in FIG. 13, and a detailed description thereof will be omitted. Step 1401 is a moving amount adjustment corresponding to brightness step. In step 1401, on the basis of L1 obtained in the brightness calculation 1 step 1302, moving amounts (m*(r–Dr), m*(g–Dg)) obtained in the moving amount calculation step 1305, and a moving amount control table S (L1) as shown in FIG. 15, processing represented by expression (18) is performed to execute moving amount adjustment processing corresponding to brightness. In the pixel moving processing step 1306, processing represented by equations (19) and (20) is performed on the basis of the results of the (r, g) value calculation step 1303 and moving amount adjustment corresponding to brightness step 1401 to obtain r' and g'. Using the results r' and g', the same processing as in FIG. 13 is performed in steps 1307 to 1309 to obtain (R', G', B').

As described above, by using the flow chart shown in FIG. 14, the same color balance adjustment processing as in the second embodiment can be implemented by software.

Fifth Embodiment

In FIGS. 4, 5, and 6, image data on the RGB space is converted into the rgb space using equations (7), (8), and (9) to perform chromaticity color balance adjustment. However, if adjustment processing is actually performed after rgb conversion, the processing includes division as represented by equations (7), (8), and (9), and the hardware scale becomes large, resulting in an increase in cost. In the fifth embodiment, the hardware scale is reduced while theoretically satisfying the algorithm shown in FIGS. 4, 5, and 6.

Figure 16:
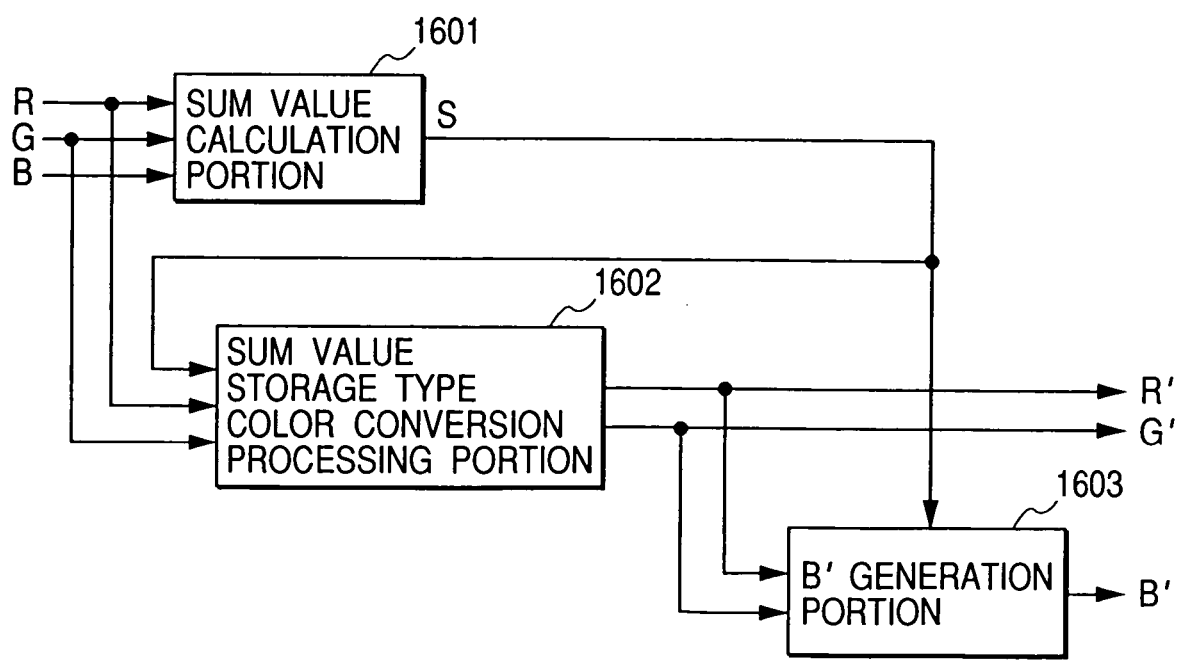
FIG. 16 is a block diagram showing the arrangement of a chromaticity adjustment processing portion 704 shown in FIG. 7.

FIG. 16 is a block diagram for explaining the processing contents of a chromaticity adjustment processing portion 704 shown in FIG. 7. Referring to FIG. 16, a sum value calculation portion 1601 calculates a sum value S of input pixel values R, G, and B given by:

$$S = R + G + B \quad (21)$$

A sum value storage type color conversion processing portion 1602 converts the pixel values R, G, and B for chromaticity color balance adjustment processing while storing the sum value S calculated by the sum value calculation portion 1601. In this embodiment, by using the sum value storage type color conversion processing portion 1602, the brightness of the input pixel value can be stored using a very simple equation. On the basis of the sum value S from the sum value calculation portion 1601 and R' and G' from the sum value storage type color conversion processing portion 1602, a B' generation portion 1603 obtains B' given by:

$$B' = S - R' - G' \quad (22)$$

Figure 17:
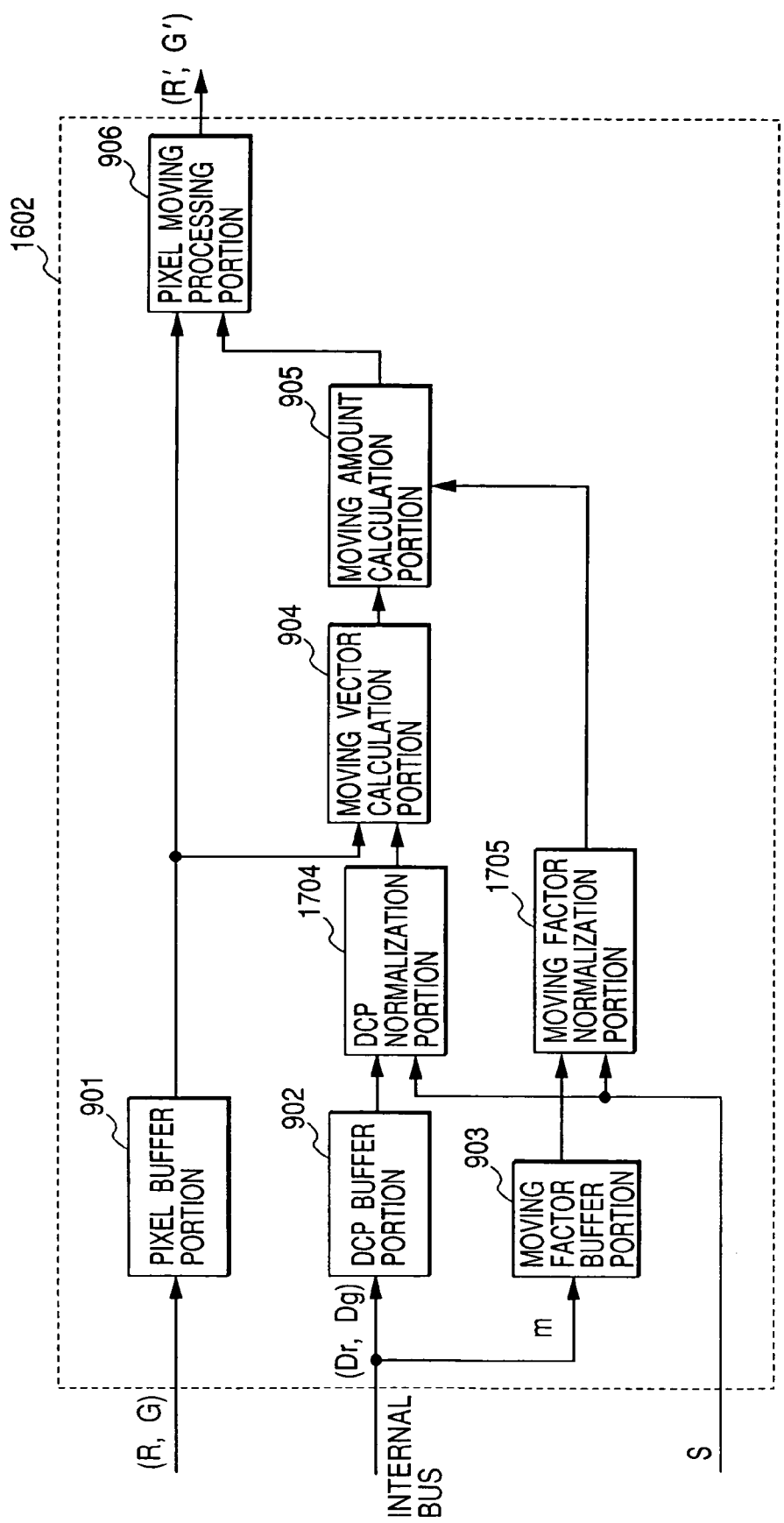
FIG. 17 is a block diagram showing the arrangement of a sum value storage type color conversion processing portion 1602 shown in FIG. 16.

FIG. 17 is a block diagram showing the arrangement of the sum value storage type color conversion processing portion 1602 shown in FIG. 16 in more detail. The same reference numerals as in the first embodiment denote the same parts in FIG. 17. A pixel buffer portion 901 temporarily stores the values of the input pixels R and G. The sum value storage type color conversion processing portion 1602 also has a DCP buffer portion 902. As described with reference to FIG. 7, the Destination Color Points (Dr, Dg) from a brightness/chromaticity adjustment map portion 102 are written in the DCP buffer portion 902 by a CPU 701 and stored. A moving factor buffer portion 903 temporarily stores a moving factor m from the brightness/chromaticity adjustment map portion 102, like the DCP buffer portion 902. A DCP normalization portion 1704 calculates Destination Color Points corresponding to the input pixel values R, G, and B on the basis of Dr and Dg in the DCP buffer portion 902 and the sum value S from the sum value calculation portion 1601 using:

$$(S^*Dr, S^*Dg) \quad (23)$$

A moving factor normalization portion 1705 calculates $$\text{normalized moving factor}: m^*S \quad (24)$$

corresponding to the input pixel values R, G, and B on the basis of the moving factor m stored in the moving factor buffer portion 903 and the sum value S from the sum value calculation portion 1601. A moving vector calculation portion 904 calculates moving vectors represented by $$(R - S^*Dr, G - S^*Dg) \quad (25)$$

from R and G from the pixel buffer portion 901 and (S*Dr, S*Dg) from the DCP normalization portion 1704.

A moving amount calculation portion 905 calculates moving amounts represented by $$(m^*S^*(R - S^*Dr), m^*S^*(G - S^*Dg)) \quad (26)$$

on the basis of the moving vectors (R−S*Dr, G−S*Dg) from the DCP normalization portion 1704 and m*S from the moving factor normalization portion 1705.

On the basis of the pixel values R and G from the pixel buffer portion 901 and the moving amounts (m*S*(R−S*Dr), m*S*(G−S*Dg)) from the moving amount calculation portion 905, a pixel moving processing portion 906 performs pixel moving processing represented by:

$$R' = R + m^*S^*(R - S^*Dr) \quad (27)$$

$$G' = G + m^*S^*(G - S^*Dg) \quad (28)$$

to obtain R' and G'.

As described above, when the processing method shown in FIGS. 16 and 17 is used, chromaticity color balance adjustment can be realized without conversion including division represented by equations (7), (8), and (9). Hence, an apparatus with a smaller hardware scale can be realized at low cost.

When the sum value S of the pixels used in FIG. 16 is defined as the brightness value of the input pixel, the sum value S is different from the luminance Y defined in the NTSC format and given by:

$$Y = 0.30^*R + 0.59^*G + 0.11^*B \quad (29)$$

The accuracy of the sum value S as brightness is relatively low. However, the sum value S can maintain a sufficient accuracy as a parameter for storing brightness and can be obtained by simple calculation. Hence, the effect unique to this embodiment, i.e., small-scale hardware for storing brightness can be obtained.

Sixth Embodiment

In the fifth embodiment, chromaticity color balance adjustment is performed independently of the value of brightness of an object pixel, as described with reference to FIG. 17. In the sixth embodiment, an apparatus capable of controlling the chromaticity adjustment amount of a pixel on the basis of brightness will be described with reference to FIGS. 18 and 19.

Figure 18:
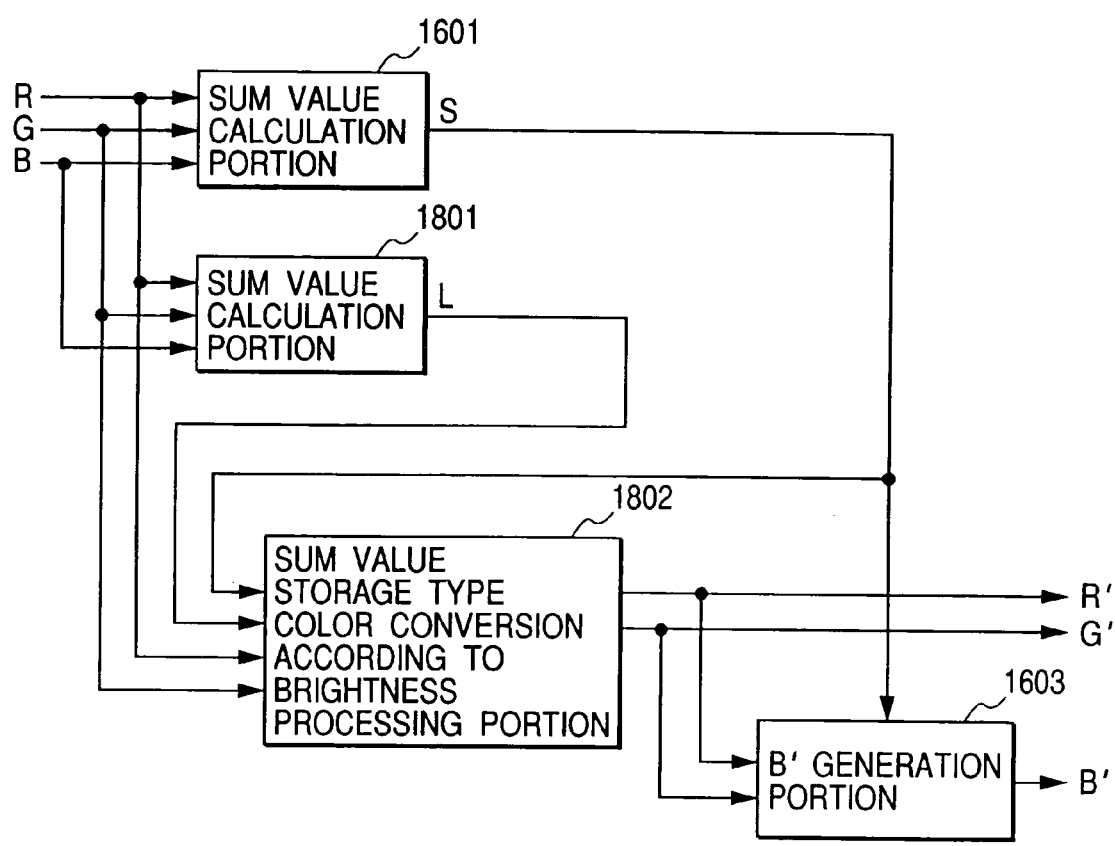
FIG. 18 is a block diagram showing the arrangement of the sum value storage type color conversion processing portion 1602 capable of sum value storage type color conversion processing corresponding to brightness, like in FIG. 16.

Referring to FIG. 18, a sum value calculation portion 1601 is the same as in FIG. 16 and calculates a sum value S given by equation (21). A brightness calculation portion 1801 calculates the brightness of an input pixel using:

$$L = 0.30^*R + 0.59^*G + 0.11^*B \quad (30)$$

In the second embodiment, brightness represented by equation (30) is used. However, an equation representing brightness is not limited to this, and the sum value S represented by equation (21) in the fifth embodiment may be used. A sum value storage type color conversion corresponding to brightness processing portion 1802 performs sum value storage type color conversion capable of controlling the chromaticity adjustment amount in response to brightness represented by equation (30). The arrangement of the sum value storage type color conversion corresponding to brightness processing portion 1802 will be described in detail with reference to FIG. 19. A B' generation portion 1603 generates B' by equation (22) using R' and G' from the sum value storage type color conversion corresponding to brightness processing portion 1802 and the sum value S from the sum value calculation portion 1601.

Figure 19:
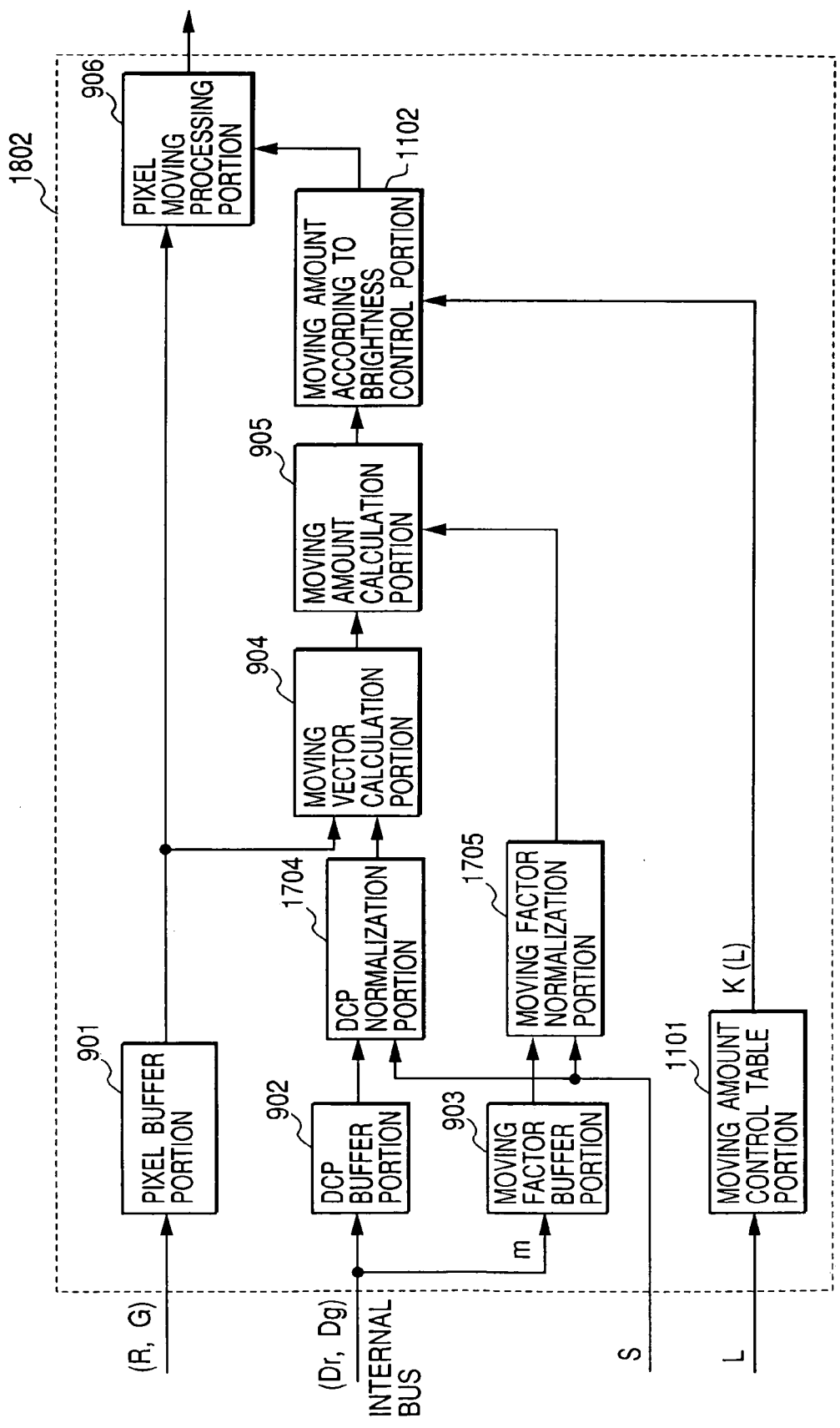
FIG. 19 is a block diagram showing the arrangement of a sum value storage type color conversion corresponding to brightness processing portion 1802 shown in FIG. 18.

FIG. 19 is a block diagram for explaining the arrangement of the sum value storage type color conversion corresponding to brightness processing portion 1802. The same reference numerals as in FIGS. 11 and 17 denote the same parts in FIG. 19. Referring to FIG. 19, a pixel buffer portion 901, a DCP buffer portion 902, a moving factor buffer portion 903, a DCP normalization portion 1704, a moving factor normalization portion 1705, a moving vector calculation portion 904, and a moving amount calculation portion 905 are the same as in the fifth embodiment shown in FIG. 17, and a detailed description thereof will be omitted. A table representing the reverse characteristics of human visual characteristics as shown in FIG. 15 is set in a moving amount control table portion 1101. In the moving amount control table portion 1101, an address of the table is designated on the basis of the brightness L from a brightness calculation portion 1001. A value K (L) corresponding to the address is output and transferred to a moving amount corresponding to brightness control portion 1102. On the basis of (m*S*(R−S*Dr), m*S*(G−S*Dg)) (expression (26)) from the moving amount calculation portion 905, and K(L) from the moving amount control table portion 1101, the moving amount corresponding to brightness control portion 1102 performs processing represented by $$(K(L)*m*S*(R-S*Dr), K(L)*m*S*(G-S*Dg)) \quad (31)$$

and transfers the result to a pixel moving processing portion 906. The pixel moving processing portion 906 executes processing represented by $$R'=R+K(L)*m*S*(R-S*Dr) \quad (32)$$

$$G'=G+K(L)*m*S*(G-S*Dg) \quad (33)$$

to obtain R' and G'.

By this chromaticity color balance adjustment processing, adjustment processing can be realized without changing the apparent adjustment amount between pixels with different brightness. In addition, when the moving amount control table portion shown in FIG. 15 is prepared in consideration of characteristics corresponding to the input/output devices shown in FIG. 2, color balance shifts of the input/output devices can be accurately adjusted.

Seventh Embodiment

Figure 20:
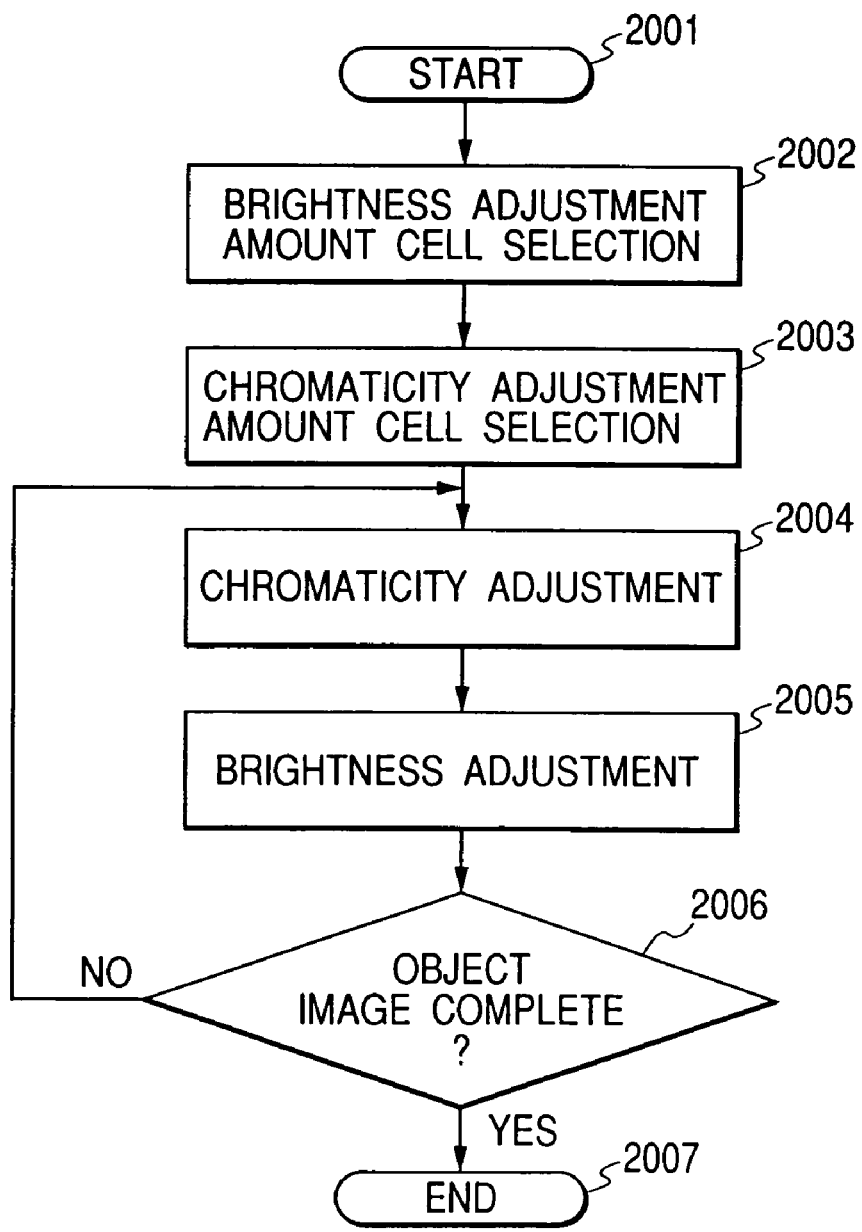
FIG. 20 is a flow chart of software for implementing the present invention.

In the fifth embodiment, the arrangement implemented by hardware has been described in detail. In the seventh embodiment, an arrangement implemented by software will be described in detail. FIG. 20 is a flow chart of software for implementing the arrangement shown in FIG. 1. Steps 2002 and 2003 correspond to processing performed in a GUI 101 and a brightness/chromaticity adjustment map portion 102 shown in FIG. 1. Steps 2004, 2005, and 2006 correspond to processing in an image input portion 103, an image processing portion 104, and an image output portion 105. Step 2001 is a start step of starting the software processing. Step 2002 is a brightness adjustment amount cell selection step of selecting a brightness adjustment amount cell of the brightness/chromaticity adjustment map portion 102 using the GUI 101. Step 2003 is a chromaticity adjustment amount cell selection step of selecting a chromaticity adjustment amount cell of the brightness/chromaticity adjustment map portion 102 using the GUI 101. Step 2004 is a chromaticity adjustment step of adjusting the chromaticity of pixel data from the image input portion 103 using the values of Destination Color Points (Dr, Dg) and moving factor (m) corresponding to the cell selected in the chromaticity adjustment amount cell selection step 2003 (the processing contents will be described later in detail with reference to FIG. 21). Step 2005 is a brightness adjustment step of adjusting the brightness of the pixel data which has undergone chromaticity adjustment using the values of brightness (L) and contrast (C) corresponding to the cell selected in the brightness adjustment amount cell selection step 2002. The pixel data which has undergone brightness adjustment is sent to the image output portion 105. Step 2006 is a step of determining whether the object image is complete. If NO in step 2006, the flow returns to step 2004 to continue processing; otherwise, the flow advances to step 2007 to end processing.

Figure 21:
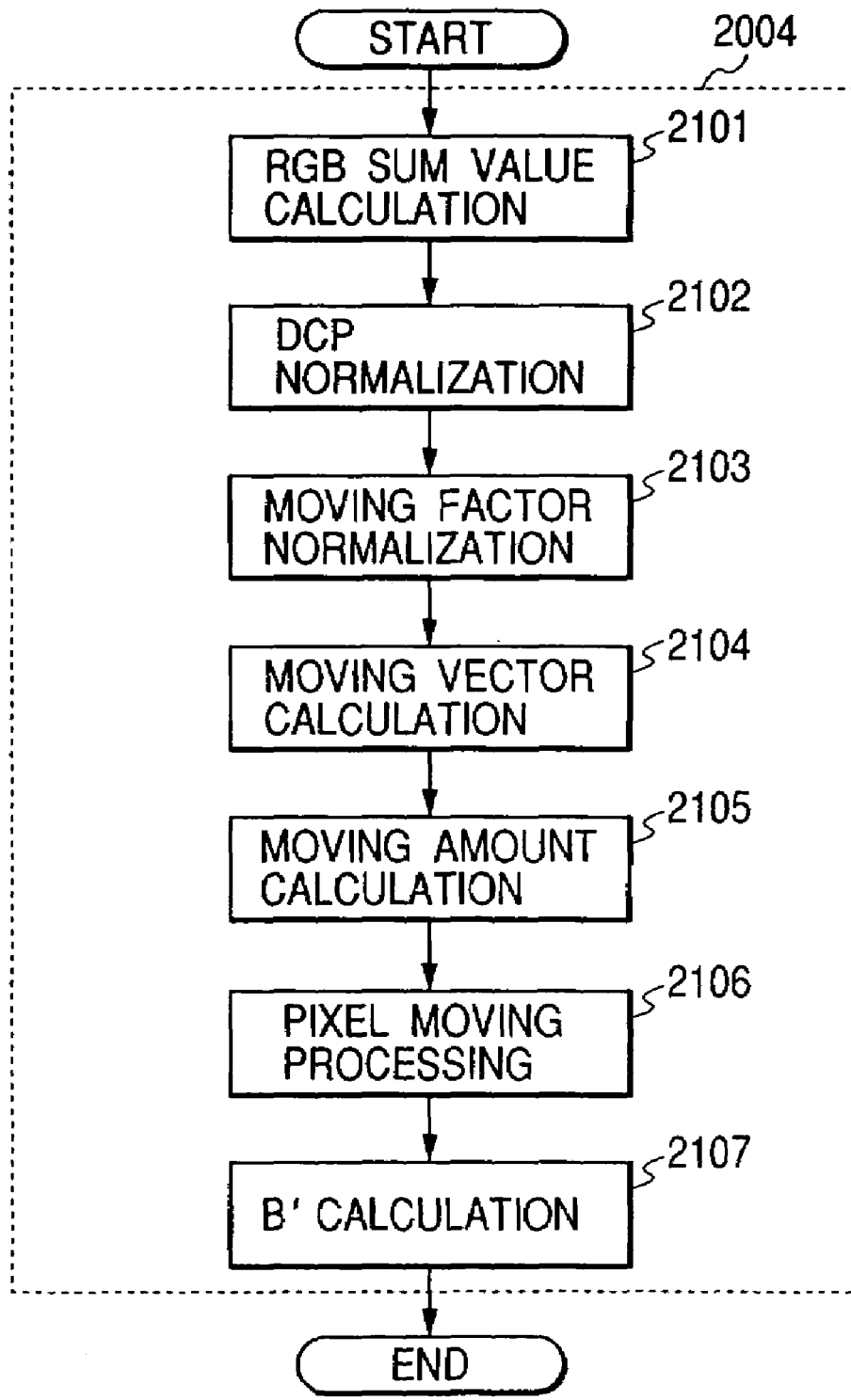
FIG. 21 is a flow chart of the chromaticity adjustment step 2004 shown in FIG. 20.

FIG. 21 is a flow chart for explaining the processing contents of the chromaticity adjustment step 2004 in detail. FIG. 21 explains an arrangement for implementing the same processing contents as in the fifth embodiment shown in FIGS. 16 and 17 by software. Referring to FIG. 21, step 2101 is an RGB sum value calculation step of calculating the sum value of input pixels using equation (21). Step 2102 is a DCP normalization step of normalizing the DCP represented by expression (23) on the basis of a sum value S obtained in the RGB sum value calculation step 2101 and (Dr, Dg) corresponding to the cell selected in the chromaticity adjustment amount cell selection step 2003. Step 2103 is a moving factor normalization step of normalizing a moving factor represented by expression (24) on the basis of the sum value S obtained in the RGB sum value calculation step 2101 and a moving factor m corresponding to the cell selected in the chromaticity adjustment amount cell selection step 2003. Step 2104 is a moving vector calculation step of calculating moving vectors represented by expression (25) on the basis of input pixels R and G and (S*Dr, S*Dg) from the DCP normalization step 2102. Step 2105 is a moving amount calculation step of calculating moving amounts represented by expression (26) on the basis of m*S from the moving factor normalization step 2103 and (R−S*Dr, G−S*Dg) from the moving vector calculation step 2104. Step 2106 is a pixel moving processing step of performing pixel moving processing represented by expressions (27) and (28) using the input pixels R and G and the moving amounts (m*S(R−S*Dr), m*S(G−S*Dg)) from the moving amount calculation step 2105. Step 2107 is a B' calculation step of calculating B' represented by equation (22) using the sum value S from the RGB sum value calculation step 2101 and the processing results R' and G' from the pixel moving processing step 2106.

As described above, by using the flow chart shown in FIGS. 20 and 21, the same color balance adjustment processing as in the fifth embodiment can be implemented by software. In the seventh embodiment as well, processing is done on the RGB space, as in the fifth embodiment. Since the processing can be realized without executing division represented by equations (7), (8), and (9), the processing speed for color balance adjustment can be largely increased.

Eighth Embodiment

In the sixth embodiment, the chromaticity color balance adjustment amount is controlled on the basis of the brightness value of a pixel using hardware. In the eighth embodiment, this arrangement is implemented by software.

Figure 22:
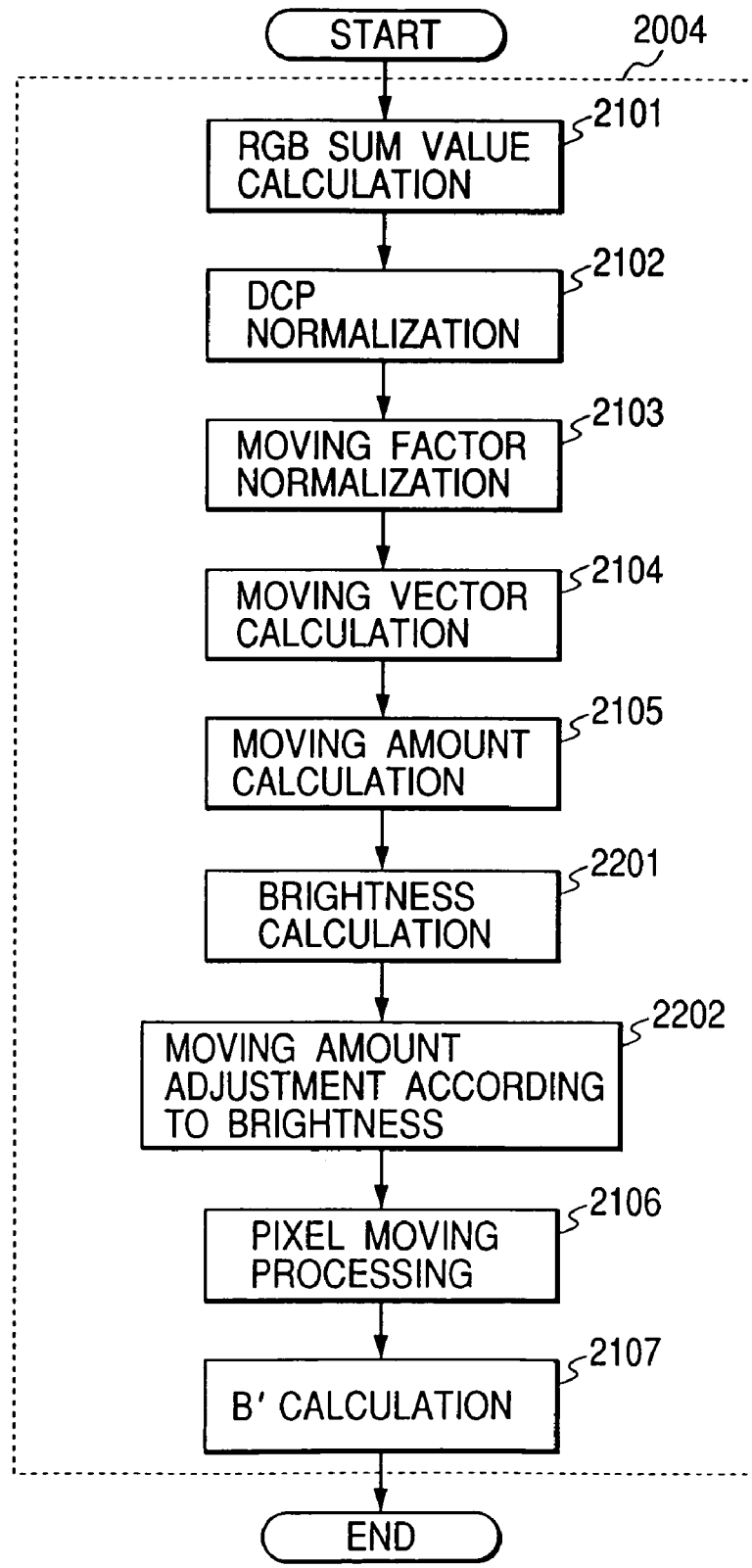
FIG. 22 is a flow chart of the chromaticity adjustment step 2004 (FIG. 20) capable of moving amount adjustment corresponding to brightness, like in FIG. 21.

In FIG. 22, the moving amount adjustment corresponding to brightness step 2201 is added to the chromaticity adjustment step 2004 shown in FIG. 21. Steps 2101 to 2105 are the same as those in the seventh embodiment shown in FIG. 21, and a detailed description thereof will be omitted. Step 2201 is a brightness calculation step of calculating brightness L represented by equation (30) in the sixth embodiment. Step 2202 is a moving amount adjustment corresponding to brightness step of adjusting the moving amounts on the basis of the moving amounts (m*S(R−S*Dr), m*S(G−S*Dg)) from the moving amount calculation step 2105 and brightness L from the brightness calculation step 2201, as represented by expression (31). Step 2106 is a pixel moving processing step of calculating equations (32) and (33) on the basis of (K(L)*m*S(R−S*Dr), K(L)*m*S(G−S*Dg)) from the moving amount adjustment corresponding to brightness step 2202 and the input pixel values R and G to obtain R' and G'. Step 2107 is a B' calculation step, as in FIG. 21.

As described above, by using the flow chart shown in FIG. 22, the same color balance adjustment processing capable of control corresponding to brightness as in the second embodiment can be implemented by software.

Other Embodiments

The functions of the above-described embodiments are also realized when program codes of software for realizing the functions of the third, fourth, seventh, and eighth embodiments are supplied to a computer in an apparatus or system which is connected to various devices to operate the various devices, and the computer (CPU or MPU) in the system or apparatus is caused to operate the various devices in response to a stored program.

In this case, the program codes of the software realize the functions of the above-described embodiments by themselves, and the program codes themselves and a means for supplying the program codes to the computer, e.g., a storage medium storing the program codes constitute the present invention.

As a storage medium for storing the program codes, a floppy disk, a hard disk, an optical disk, a magnetooptical disk, a CD-ROM, a magnetic tape, a nonvolatile memory card, a ROM, or the like can be used.

The functions of the above-described embodiments are realized not only when the supplied program codes are executed by the computer but also when the program codes realizes the functions of the above-described embodiments in cooperation with the OS (Operating System) running on the computer or another application software.

The functions of the above-described embodiments are also realized when the supplied program codes are stored in the memory of a function expansion board in the computer or a function expansion unit connected to the computer, and the CPU of the function expansion board or function expansion unit performs part or all of actual processing on the basis of the instructions of the program codes.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method comprising the steps of:
 detecting brightness values for RGB input image data;
 generating, from the RGB input image data, image data mapped on a two-dimensional space, each point in that space being represented by two coordinates, wherein the mapped image data is rg image data, a red component of the rg image data represents a ratio of the red component of the RGB input image data to the red, green and blue components of the RGB input image data, and a green component of the rg image data represents a ratio of the green component of the RGB input image data to the red, green and blue components of the RGB input image data;
 inputting color balance adjustment information to an operation unit representing an adjustment range, based on a user instruction;
 setting a color balance adjustment condition for the input image data on the basis of the brightness value of the input image data and the color balance adjustment information;
 performing color balance adjustment, on the basis of the set color balance adjustment condition, on the image data mapped on the two-dimensional space; and
 outputting the image data on which the color balance adjustment has been performed, the outputting including at least one of (1) storing that image data, (2) printing that image data, and (3) displaying that image data,
 wherein, in the color balance adjustment performed in said color balance adjustment step, the color balance adjusted values are determined by using the adjusted image data mapped on the two-dimensional space and the brightness value detected in said detecting step in such manner that the brightness value before the adjustment coincides with the brightness value after the adjustment.

2. A method according to claim 1, wherein the color balance adjustment information represents a cell selected on a color adjustment map acting as a graphical user interface, on the basis of a user instruction.

3. A method according to claim 1, further comprising the step of setting a target value and a moving factor on the two-dimensional space, on the basis of a user instruction,
 wherein the color balance adjustment is performed on the basis of the target value and moving factor.

4. A method according to claim 1, wherein the color balance adjustment is performed according to the brightness value of the RGB input image data.

5. An image processing apparatus comprising:
 detection means for detecting brightness values for RGB input image data;
 generating means for generating, from the RGB input image data, image data mapped on a two-dimensional space, each point in that space being represented by two coordinates, wherein the mapped image data is rg image data, a red component of the rg image data represents a ratio of the red component of the RGB input image data to the red, green and blue components of the RGB input image data, and a green component of the rg image data represents a ratio of the green component of the RGB input image data to the red, green and blue components of the RGB input image data;
 input means for inputting color balance adjustment information to an operation unit representing an adjustment range, based on a user instruction;
 setting means for setting a color balance adjustment condition for the input image data on the basis of the brightness values of the input image data and the color balance adjustment information;
 color balance adjustment means for performing color balance adjustment, on the basis of the set color balance adjustment condition, on the image data mapped on the two-dimensional space; and outputting means for outputting the image data on which the color balance adjustment has been performed, the outputting including at least one of (1) storing that image data, (2) printing that image data, and (3) displaying that image data, wherein, in the color balance adjustment performed by said color balance adjustment means, the color balance adjusted values are determined by using the adjusted image data mapped on the two-dimensional space and the brightness value detected by said detecting means in such manner that the brightness value before the adjustment coincides with the brightness value after the adjustment.

6. A computer-readable storage medium which stores, in the form of computer-executable instructions, a program to execute an image processing method comprising the steps of:

detecting brightness values for RGB input image data;

generating, from the RGB input image data, image data mapped on a two-dimensional space, each point in that space being represented by two coordinates, wherein the mapped image data is rg image data, a red component of the rg image data represents a ratio of the red component of the RGB input image data to the red, green and blue components of the RGB input image data, and a green component of the rg image data represents a ratio of the green component of the RGB input image data to the red, green and blue components of the RGB input image data;

inputting color balance adjustment information to an operation unit representing an adjustment range, based on a user instruction;

setting a color balance adjustment condition for the input image data on the basis of the brightness value of the input image data and the color balance adjustment information;

performing color balance adjustment, on the basis of the set color balance adjustment condition, on the image data mapped on the two-dimensional space; and outputting the image data on which the color balance adjustment has been performed, the outputting including at least one of (1) storing that image data, (2) printing that image data, and (3) displaying that image data, wherein, in the color balance adjustment performed in said color balance adjustment step, the color balance adjusted values are determined by using the adjusted image data mapped on the two-dimensional space and the brightness value detected in said detecting step in such manner that the brightness value before the adjustment coincides with the brightness value after the adjustment.

* * * * *